United States Patent
Stromberg et al.

(10) Patent No.: US 7,460,977 B2
(45) Date of Patent: Dec. 2, 2008

(54) METHOD AND APPARATUS FOR ALIGNMENT OF COMPONENTS

(75) Inventors: Peter Stromberg, Vastra Frolunda (SE); Reine Nilsson, Gothenburg (SE); Roberth Asplund, Gothenburg (SE); Bo Baversjo, Vallda (SE); Peter Sandstrom, Askim (SE)

(73) Assignee: Fixturlaser AB, Ostergardsgatan (SE)

( * ) Notice: Subject to any disclaimer, the term of this patent is extended or adjusted under 35 U.S.C. 154(b) by 0 days.

(21) Appl. No.: 11/676,408

(22) Filed: Feb. 19, 2007

(65) Prior Publication Data
US 2008/0201097 A1   Aug. 21, 2008

(51) Int. Cl.
*G06F 19/00* (2006.01)

(52) U.S. Cl. .................. 702/150; 227/15; 340/500; 340/540; 340/686.1; 340/686.2; 356/153; 417/359; 700/57; 702/1; 702/127

(58) Field of Classification Search .......... 227/15, 227/181.1; 340/500, 540, 686.1, 686.2; 356/153, 356/155; 417/359; 700/57, 279; 702/1, 702/85, 90, 94, 127, 150

See application file for complete search history.

(56) References Cited

U.S. PATENT DOCUMENTS

| | | | | |
|---|---|---|---|---|
| 2,876,443 A | * | 3/1959 | Honeyman | 200/56 R |
| 3,192,631 A | * | 7/1965 | Goguen et al. | 33/278 |
| 3,528,748 A | * | 9/1970 | Burch et al. | 356/138 |
| 4,574,490 A | * | 3/1986 | Curchod | 33/203.18 |
| 5,077,905 A | * | 1/1992 | Murray, Jr. | 33/412 |
| 5,553,389 A | * | 9/1996 | Winslow et al. | 33/203.18 |
| 6,223,102 B1 | * | 4/2001 | Busch | 700/279 |
| 6,665,064 B2 | * | 12/2003 | Hermann | 356/153 |
| 6,931,738 B2 | * | 8/2005 | Bodgren et al. | 33/286 |
| 6,968,625 B2 | * | 11/2005 | Segerstrom et al. | 33/286 |
| 7,312,871 B2 | * | 12/2007 | Henry | 356/400 |
| 2004/0252302 A1 | * | 12/2004 | Henry | 356/400 |

* cited by examiner

*Primary Examiner*—Edward R Cosimano
(74) *Attorney, Agent, or Firm*—Schwegman, Lundberg & Woessner, P.A.

(57) ABSTRACT

Methods and apparatus are described for aligning components. Misalignment is calculated based on sensed values with a controller illustrating a process for data acquisition with graphical icons and indicia that include and/or are based on sensed data. The alignment process also includes graphical icons showing the process for alignment and the direction and amount of correction needed to achieve adequate alignment.

35 Claims, 17 Drawing Sheets

METHOD AND APPARATUS FOR ALIGNMENT OF COMPONENTS

FIELD

The present invention relates to a method and apparatus for measuring the relative positions of a first component and a second component, and, more specifically, to methods and devices to convey information relating to the relative positions of components.

BACKGROUND

In various fields of technology there is a need for correct alignment of different components and/or machines in relation to each other. For example, during operation of large engines, pumps, machines, and similar equipment, it is essential that an output shaft of a propelling machine, for example in the form of an engine or electric motor, is correctly aligned with respect to an input shaft of a propelled machine, for example in the form of a pump. In this manner, the output power of the machine is transferred via the rotational movement of the machine shaft to the input shaft of the propelled machine in an optimal manner. Any misalignment of the two shafts may result in a poor efficiency and an increased risk for wear and damage to one or both machines.

In the present technology field, there is a demand for correct alignment of the machine output shaft in relation to the receiving machine input shaft. In this regard, it should be noted that the two shafts may present alignment errors of generally two different kinds. First, the shafts may be disposed at a certain angle with respect to each other, which is referred to as an angular error, i.e., a "horizontal angular error" and a "vertical angular error". Second, even though the shafts may be parallel to each other, they may be slightly displaced with respect to each other so that they extend along two separated directions, i.e., in a parallel manner. This is referred to as "horizontal offset" and "vertical offset". If these errors exceed predetermined limit values, it can be assumed that the shafts, and their corresponding machines, are poorly aligned with reference to each other. Poor alignment is a cause of increased energy consumption and machine failure, such as leaking seals, bearing failure, metal fatigue failure, etc.

Consequently, there is a general demand for systems, devices and methods for aligning various pieces of machinery that include rotatable shafts. Such systems and methods may be used for engines and pumps and similar equipment. Generally, they may be used in power plants, chemical plants, oil refineries, and other manufacturing environments, in particular in applications which comprise high speed or in applications comprising expensive, process critical machines, which must be correctly aligned.

There is further a demand to provide improved devices for assisting a technician is aligning components and/or machines. One prior technique required a highly trained technician to fix a support with two indicator dials and then shim at least one of the propelling machine or the propelled machine through a trial and error to minimize a face dial indicator and then shim the machine again to minimize the rim dial indicator. The technician must repeatedly stop and re-read the dials and then recalculate where and the amount to shim or move the machine to move it into alignment. Moreover, some technicians used a trial and error method where a machine is moved and then the readout is checked to see if it moved the device into closer alignment. If not the machine was moved in a different manner. This trial and error approach and other approaches require significant time to check an alignment and realign as needed. In some crucial applications, a company can lose significant revenues if a crucial machine is not working, e.g., improperly aligned.

Overview

As an overview the methods and apparatus as described herein is briefly discussed. A method for aligning components can include receiving a signal from an alignment measurement device in the controller, displaying a first real-time position of the alignment measurement device, storing a first reading from the alignment device. The method can further include displaying a second real-time position of the alignment device in the controller, displaying alignment measurement positions that represent at least one of a further reading position of the alignment measurement device and a non-reading position of the alignment measurement device, storing a second reading from the alignment measurement device. The method further includes calculating the alignment of the components and displaying the calculation. The display of the calculation includes numerical displays and graphical displays. The method may further include additional measurement and reading steps. For example, the method may further include, after storing the second reading, further displaying alignment measurement positions that represent at least one of a further reading position of the alignment measurement device and a non-reading position of the alignment measurement device with the at least one of the alignment measurement device and a non-reading position of the alignment measurement device being changed based on one of the first reading and the second reading. It is further contemplated that the display of calculation includes graphically displaying a top plan view of the components with the alignment measurement device in a non-vertical position and/or includes graphically displaying an elevational view of the components with the alignment measurement device in a non-horizontal position. In an embodiment, the display automatically switches between the top plan view and the elevation view based on the position of the alignment measurement device.

It is further disclosed that the display can include displaying indicators for moving a component to realign the components in at least one of the top plan view and the elevational view. For example, the indicators or icons representing the realignment amount and/or direction can be sized and resized in essentially real-time. These indicators or icons may also be color coded. In an example, the indicators include directional arrows that indicate an alignment direction. Such indicators can graphically indicate horizontal angular misalignment and horizontal offset in a first view in separate icons, and graphically indicating vertical angular misalignment and vertical offset in separate icons. It is further disclosed that the display can include a first real-time position including displaying the position in a three dimensional, perspective view. Moreover, the display can show alignment measurement positions includes displaying a color coded, first region in which the alignment measurement device can take a measurement and displaying a color coded, second region in which the alignment measurement device can not take a measurement. Measurement prohibited areas can include a no measurement region that is in the range of +/−15 degrees to +/−30 degrees from prior measurements.

It is further disclosed that some distance measurements must be loaded into the controller from a source other than the measurement devices. Examples of these distance measurements include a distance between a transmitter and a receiver of the alignment measurement devices, a distance from an end of a first component to a front support of the component, and a distance between front support and the rear support of the component.

It will be appreciated that the above and the further disclosure may include instructions stored on a computer-readable medium to cause a computer to perform any method described herein An apparatus for aligning components is further described herein. Such an apparatus can include an input to receive positional signals from an alignment measurement device, a processor operatively coupled to the input, the processor to generate a real-time graphic signal based on received signals at the input and trigger alignment readings from the alignment measurement device, the processor to determine positions whereat successive alignment readings should not be made and to output a no reading signal, and the processor to calculate misalignment of components engaged by the alignment measurement device, and a display operatively coupled to the processor, the display to show a real-time position of the alignment measurement device and a no reading area based on the no reading signal from the processor, and the display to graphically indicate the calculated misalignment. The apparatus is to take at least three alignment readings from the alignment measurement device prior to calculating misalignment of components. The apparatus will further determine no measurement zones or angular areas so that a no reading signal that measures between +/−15 degrees and +/−30 degrees from a measurement position of the alignment device can be enforced and displayed. The display receives the no reading signal and simultaneously displays the no reading area and the position of the alignment device. The display shows a three dimension view of the measurement area of the components and the position of the alignment device. The processor can automatically take an alignment reading when the alignment measurement device is moved outside a no reading area. The processor reads the input after calculation of misalignment to produce real-time signal to control the display to show an elevational view with the alignment device in a non-horizontal position and to show a top plan view with the alignment device in a non-vertical position, each of the views including graphical misalignment indicators. The graphical misalignment indicators include directional arrows that show the direction that each end of a moveable component must be moved to align the components. The directional arrows are sized to correspond to the magnitude of alignment needed to align. The graphical misalignment indicators include a horizontal angular alignment icon, horizontal offset alignment icon, vertical angular alignment icon, and a vertical alignment offset icon. These icons can be color coded. The processor continues to read the input, recalculate the misalignment, and send signals to the display to show changes to misalignment in essentially real time. The display can show a three dimension view of the real-time position of the alignment measurement device and a three dimension view of a no reading area based on the no reading signal from the processor. The display can show a two dimension view of a misalignment graphic of a component to be adjusted into alignment.

The apparatus can further include a wireless input for wireless communication with an alignment measurement device.

The apparatus can further include a memory operatively coupled to the processor and the input, a user input integrated into the display, and an output to output data.

This overview is intended to provide an overview of the subject matter of the present patent application. It is not intended to provide an exclusive or exhaustive explanation of the invention. The detailed description is included to provide further information about the subject matter of the present patent application.

BRIEF DESCRIPTION OF THE DRAWINGS

In the drawings, which are not necessarily drawn to scale, like numerals may describe substantially similar components in different views. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
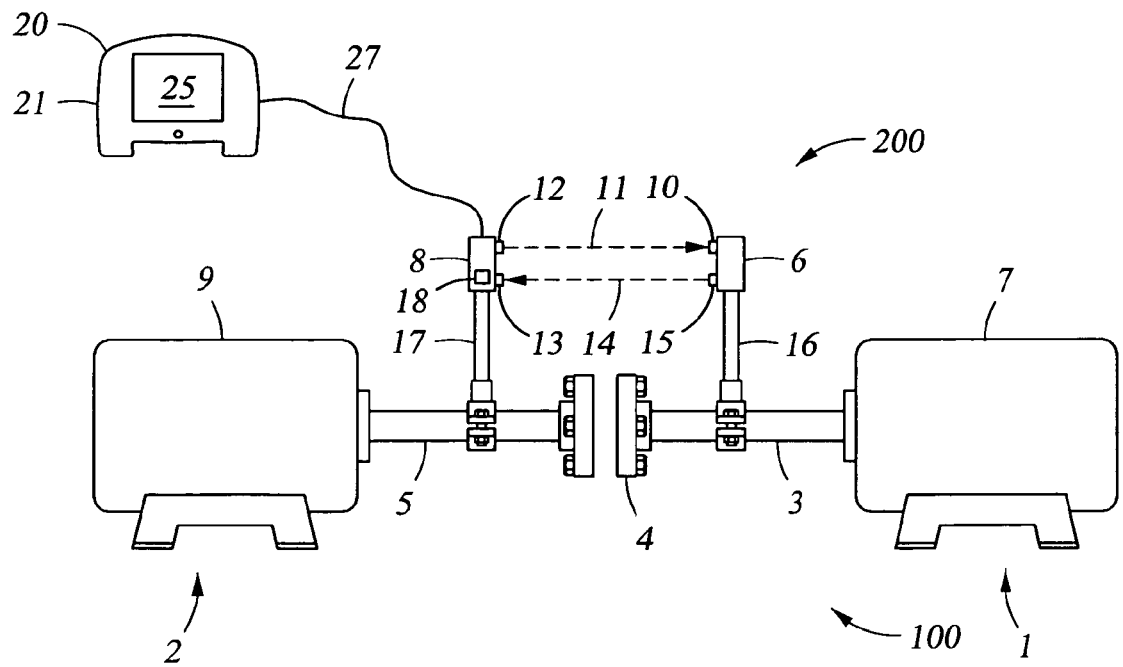
FIG. 1 shows in a schematic view of an alignment set-up.

FIG. 1 shows a schematic view of a measurement and alignment system 200 for a power transfer arrangement 100 according to an example with which the invention can be suitably used. The arrangement 100 includes a first machine 1, which can be constituted by a motive device, such as an engine or electric motor, and a second machine 2 linked to the first machine 1,. The output power of the first machine 1 is intended to be transferred to the second machine 2. The second machine 2 is a propelled unit such as a pump or a generator in an example. The invention is not limited to be used with an engine and a pump arrangement, but can be implemented for all types of measurements of the relative position between a first component and a second component during various types of operational conditions.

The output power of the machine 1 is transferred to the pump 2 via an output shaft 3 of the machine 1 to an input shaft 5 of the machine 2. A coupling 4 joins the output shaft 3 to the input shaft 5. The output shaft 3 must be in correct alignment with the input shaft 5. It is desired to have the alignment of shafts 3, 5 to be within small tolerances, which are determined by a particular application of the machine arrangement. In many applications, it is desired that the alignment between the shafts 3, 5 be off by less than millimeters. The alignment can be evaluated by determining the angular alignment errors and offset alignment errors of the two shafts 3, 5. There is a need for determining whether these parameters are within predetermined allowed limit values or tolerances and conveying this information to a user or technician.

The present invention is not limited to be used with any particular type of propelling machine or propelled machine, or other equipment. The equipment for which the invention is used does not itself form part of the present invention unless expressly claimed. Generally, the invention can be used in any situation in which there is a demand for aligning two components arranged for transmitting power in any direction between the components. In particular, the invention is used for alignment of co-linear centers of rotation of two or more shafts as rotatable shafts form a common type of power transfer arrangement. For example, the invention can be used for alignment of machines such as engines and pumps. The invention can also be used in situation in which no transmission of power is intended but there is a desire for precise alignment of other components. For example, the relative position between two components, for example, a machine and its support structure, can generally be measured at different states of operation for precise alignment there between.

The present methods and systems are suitable for cooperating with many different types of measurement or alignment systems. One type of alignment system is disclosed in publication WO 2003/089875, titled METHODS AND APPARATUS FOR ALIGNMENT OF COMPONENTS, which is hereby incorporated by reference for any purpose. Other alignment systems can be found in U.S. Pat. Nos. 6,665,064; 5077905; 6,223,102, 6,968,625; and 6,931,738, which are also incorporated by reference.

A measurement system 200 includes a first measuring device 6, a second measurement device 8, and a controller unit 20 in communication with at least one of the measuring devices 6, 8. The first measurement device 6 is mounted in a certain position with respect to a housing 7 of the machine 1 during alignment of the machines 1 and 2. In one example, the device 6 is mounted directly to shaft 3. The second measurement device 8 is mounted in a certain position with respect to a housing 9 of the machine 2 during alignment of the machines 1 and 2. In one example, the device 8 is mounted directly to shaft 5 with the coupling 4 intermediate the devices 6, 8. Accordingly, the measuring devices 6, 8 measure the relative positions of shafts 3, 5. Brackets 16, 17 mount the measuring devices 6, 8, respectively, in linearly fixed positions. In one example, brackets 16, 17 each include at least one elongate support, such as a metal rod, with a mounting fixture at one end for removably fixing the elongate support to a shaft. The measuring devices 6 and 8 include housings with sensors and transmitters and other electronics and devices therein. The housings are mounted along the length of the elongate supports. In an example, the measuring devices are slidable on the elongate supports. The fixture includes a chain for wrapping around the shaft and a clamp fixture for the chain to fix the bracket 16 or 17 in place. Accordingly, the measurement devices 6, 8 are linearly fixed relative to each other but are rotatable with the shafts 3, 5, respectively.

It can be noted that either one of the machine 1 and the machine 2, for example, the machine 2 is stationary, i.e., it is not intended to be moved. The other machine, i.e., the machine 1 in this example, is movable. The invention can thus be used for an application in which a measurement device 6 or 8 is mounted relative to a stationary apparatus and another measurement device 6 or 8 is mounted on a movable apparatus. However, the invention is not limited to such applications, but can also be used with non-movable machines. In general the machine that provides the motive force is usually moveable with the propelled or motive force receiving machine being immovable. In the example, of an electric motor and a pump, the electric motor would be movable whereas the pump would be fixed. Typically the electrical connections to the electric motor allow for some movement. On the other hand a pump is typically connected to fixed input and output pipes that are part of a larger supply and possibly manufacturing facility, and can not be moved. However, in some applications both machines 1 and 2 are adjustable to correct their relative alignment.

The first measurement device 6 includes a first signal source 10 to transmit a measurement signal 11 directed towards the second measurement device 8. In an example, source 10 outputs a laser light beam. In an example, the source 10 includes a 650 nm, class II diode laser, with a power rating of less than 1.0 milliwatt with an effective range of up to about 10 meters. The output 10 can output a laser in a fan line of at least six degrees. The second measurement device 8 includes a signal detector 12 arranged for detecting an incoming signal, e.g., signal 11, from the first signal source 10. In an example, the detector 12 is a photodetector for detecting a laser light. The detector 12 includes a charge coupled detector (CCD) with a detector length of about 30 mm and a resolution of one micrometer. The signal detector can further include optical filters and sunlight signal suppression. The second measurement device 8 further includes an inclinometer 18 that detects its inclination with respect to true vertical or true horizontal position. In an embodiment, the inclinometer 18 has an accuracy of +/−0.5 degree.

In a further embodiment, the second measurement device 8 includes a second signal source 13 for producing a further signal 14 intended to be directed towards the first measurement device 6. In an example, second source 13 outputs a laser light beam. The first measurement unit 6 includes a signal detector 15 arranged for detecting an incoming signal, e.g., signal 14 from the second signal source 13. In an example, the detector 15 is a photodetector for detecting a laser light. The second measurement device 8 can also include an inclinometer. Embodiments of the present invention can alternatively be adapted to be used with other types of measurement devices. For example, measurement devices of the type which do not use laser light but some other form of light source or electronic signal source can be used with the present invention. The set of measurement devices can include a first measurement device including a light source, which cooperates with a second measurement device that includes a light reflector. The reflected light is detected by means of a light detector on the first measurement device.

The controller unit 20 includes a housing 21 within which electronics and other components are housed. The housing 21 is adapted to be a handheld device in an example. In an example, the housing is the size of a laptop computer or personal data assistant for ease of use by a technician. The housing 21 can be made of a high impact plastic, metal or a combination of both. As the controller unit is used in manufacturing environments, it is sealed against dust, water and gas. A display 25 is mounted to the housing 21 such that the display is viewable to a user to present data, which in turn is transformed within the alignment system 200. In an example, the display 25 is a liquid crystal display (LCD) that can be at least 131×98 mm in size, backlit, with at least full VGA resolution. In an example, the display 25 further includes a touch screen as a user input. The controller unit 20 communicates with at least one of the measurement units 8 over a communication channel 27, which in one example is a wired connection, for example, an EIA-485 connection or an EIA-422 connection. In an example, the communication channel is a wireless connection, for example, an IEEE 802.11-type or Bluetooth-type connection.

Figure 2:
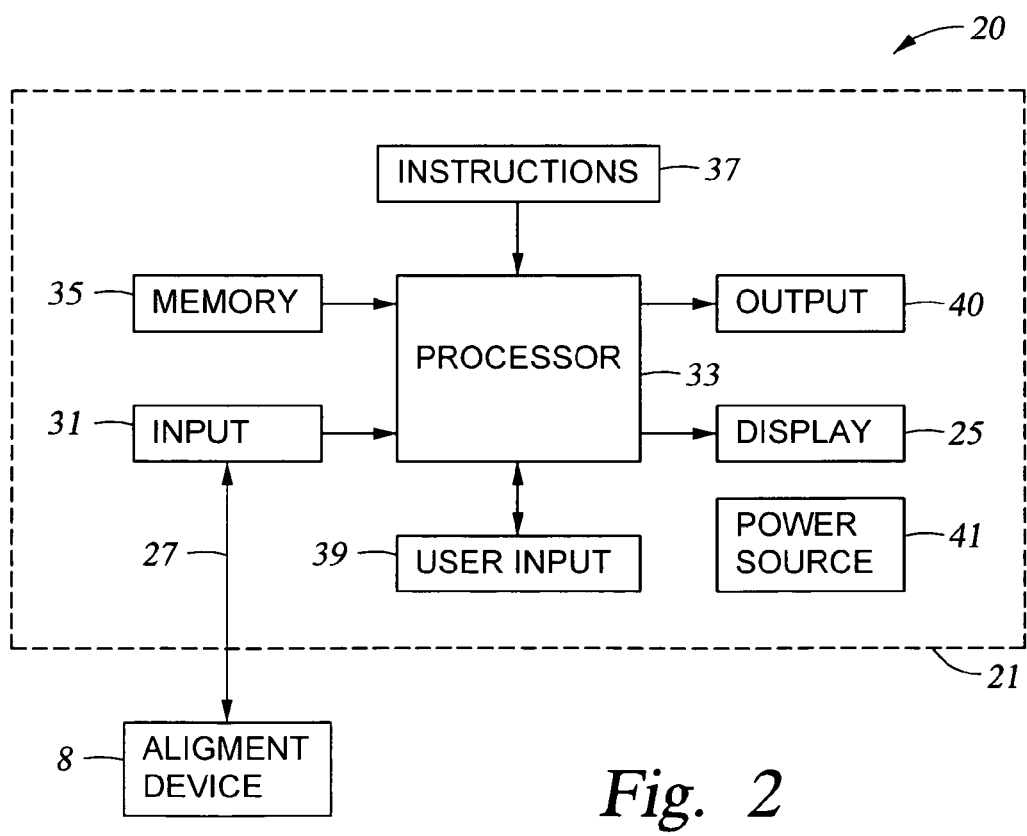
FIG. 2 shows a schematic view of a controller.

FIG. 2 shows a schematic view of the controller unit 20. Controller unit 20 is adapted to receive or read data from the alignment system, e.g., from measurement device 8, and interpret the data and present options, guidance, and data to a user or to a subsequent system. Accordingly, the controller unit 20 includes an input 31 that interfaces with the measurement system such that data is read from, and may be transmitted to, the measurement system via communication channel 27. The input 31 communicates with a processor 33. In an example, the processor 33 can be a processor from the Intel Corporation of Santa Clara, Calif., e.g., an Intel X-scale processor of at least 400 Mhz. The processor 33 is adapted to receive information from the input 31 or data stored in a memory 35, and load instructions from an instruction memory 37. In an example, memory 35 is a random access memory, for example, a DRAM or SRAM. The instruction memory 37 is a read only memory or other non-volatile memory device. The processor 33 is further in communication with the display 25 to show data, instructions, and generating graphics to a user and in communication with a user input 39. The user input 39 is a touchscreen integrated with the display 25. In an example, the user input 39 includes a keypad to supplement or replace the touch screen. The controller unit 20 further includes an output 40, which may include a wireless output (Bluetooth, IEEE 802.11, etc.) or may include a universal serial bus (USB) host port or USB slave port, or Ethernet port. Other outputs are within the scope of the present invention to connect the controller unit to further devices and computer systems. A power source 41 is provided to power the controller unit 20. The power source can include a rechargeable battery, an internal transformer to recharge the battery or connect standard power grid to the controller unit 20.

Figure 3A:
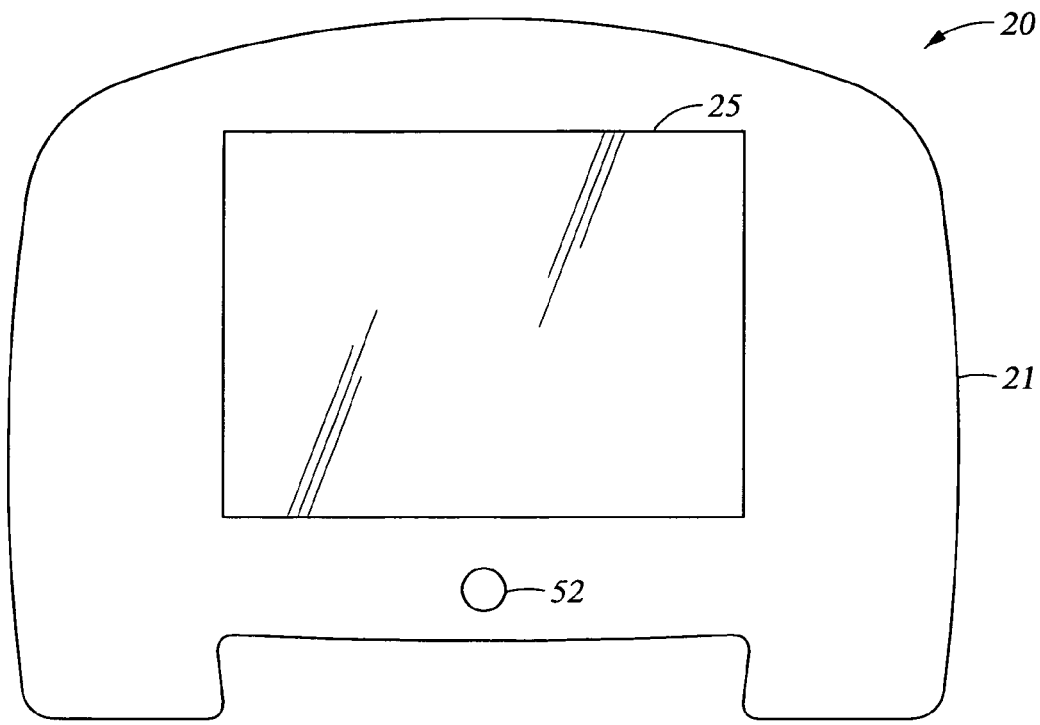
FIGS. 3A-3L show a sequence of graphical user interfaces that demonstrate steps in a method according to various embodiments of the present invention.

FIGS. 3A-3L show views of graphical user interfaces that demonstrate methods and functions according to various embodiments of the present invention. FIG. 3A shows a top, plan view of the controller unit 20 with a housing 21 and the display 25, which is to display the graphical user interface(s). A start button 51 is provided to begin a measurement and alignment procedure.

Figure 3B:
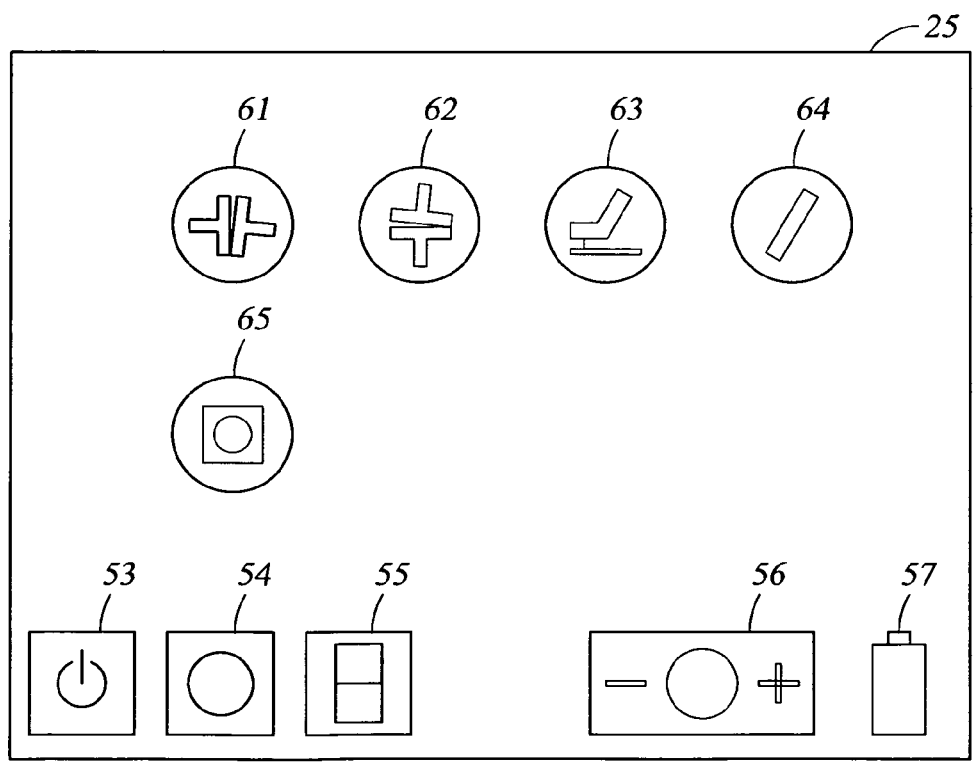

FIG. 3B shows a view of display 25 having a graphical user interface thereon, which shows a plurality of icons that represent various selectable functions of the controller unit. Some of these icons are selectable using the user input as a touch screen or a cursor on the display. Icon 53 represents a power off button. Icon 54 represents a communication link or other diagnosis of the controller unit 25. Icon 55 launches the file server to access files stored with the controller unit or other file storage locations. Icon 56 is a screen control icon that controls at least one of the brightness or the contrast of the screen display 25. Icon 57 represents the power source and, particularly, battery power level. These icons represent system controls and related functions. A group of icons are positioned upwardly in the display 25 that represent measurement and alignment functions. One icon 61 launches a measurement process with the controller unit 20 and the measurement and alignment system 200. Icon 62 triggers a vertical shaft alignment, which may be addressed in a similar fashion as described herein. Icon 63 triggers a soft foot or support check. This check to see if the feet or support of the moveable machine are properly secured so that the machine does not improperly wiggle, twist, or bend during operation and/or measurement. Icon 64 triggers a thermal offset that allows the technician to set a target for thermal expansion or retraction. Icon 65 triggers a raw sensor feed that displays the live values from the measurement devices.

Figure 3C:
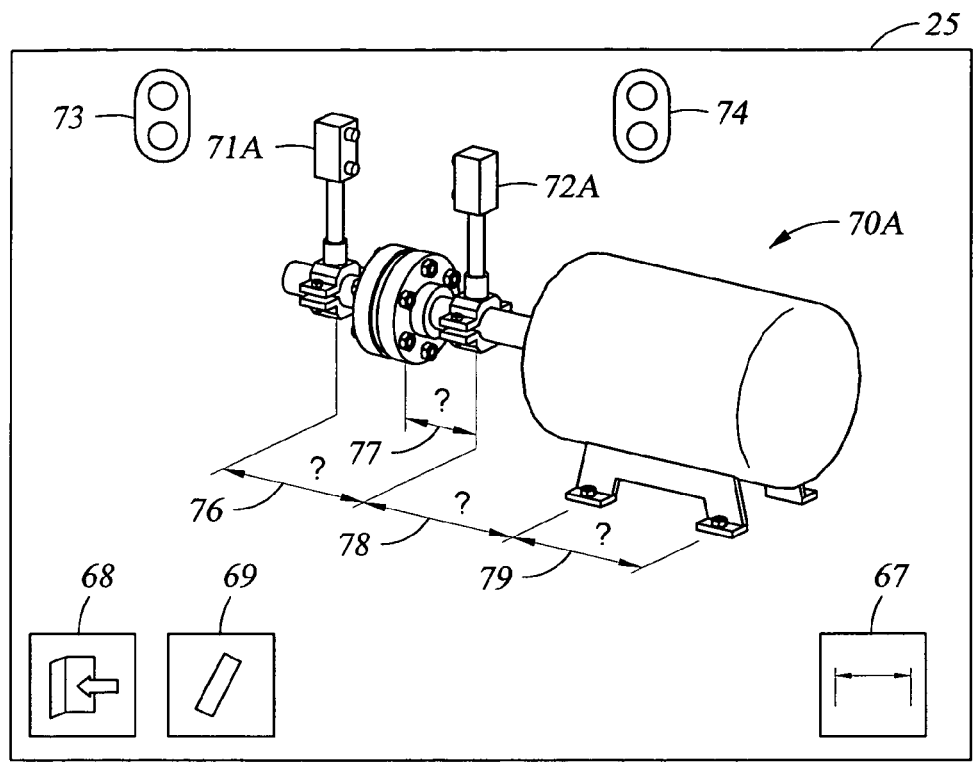

FIG. 3C shows a view of display 25 having a graphical user interface (GUI) thereon, which shows a plurality of icons 67, 68, and 69 that represent various selectable functions of the controller unit. Icon 67 is a permanent icon on this GUI that allows the user to toggle between showing the distance icons 76, 77, 78, and 79 and not showing these distance icons. The default is to show these icons to prompt the technician to enter the distance values that are required to calculate the alignment errors and offsets. However, once the distances are known, for example by entering the distance data by manual entry or loading a data file, then the user may desire to remove the distance icons 76, 77, 78, and 79 from the GUI for clarity. Icon 67 as shown has a line through it that informs the user that selecting the icon 67 will remove distance 76, 77, 78, and 79. The icon 67 will then be shown without a line through so that the user is informed that pressing the icon will redisplay the distances on the GUI. It will be understood that through the discussion of icons that pressing, selecting, activating or other similar terms refer to providing an input with respect to that icon, which in turn causes some action by the control unit to transform data in some way, e.g., store data, change the GUI, prompt the technician, etc.

The graphical user interface of FIG. 3C further shows a rendering or image 70A of the component system 100 and a rendering or image 71A, 72A of the measurement and alignment system 200. Renderings 70A, 71A, 72A are three dimension views. It will be appreciated that these renderings need not be to scale but should accurately display the systems 100, 200 to the technician with regard to three dimensional space. The rendering 70A is further simplified by only showing the moveable component, its associated shaft, and the shaft of the nonmoveable component, which nonmoveable component shaft is fixed to the shaft of the moveable component. The renderings 71A, 72A are accurate graphical representations of the measurement devices, e.g., measurement devices 6, 8 discussed above, so that the technician is reminded that certain measurement units should be used with the controller unit and how to correctly mount the measurement devices 6, 8. In the illustrated example, the renderings 71A and 72A each show the chain or strap, a fixture for engaging the chain on the shaft, two elongate supports, and a housing on the supports.

The icons 73, 74 are in the form a traffic light and represent that the measurement signal, e.g., a laser, is being received by the respective, measurement device 6, 8. One light on each of the icons 73, 74 is green, which indicates reception of the measurement signal, e.g., a laser. Another light on each of the icons 73, 74 is red, which indicates non-reception of the measurement signal, e.g., a laser. If only one of the measurement devices 6, 8 receives the signal and the other only transmits, then only one of the two icons, e.g., icon 73 is used. In another example, the two icons 73, 74 can be tied together so that they both are red when either measurement device 6, 8 is not receiving a signal and it should be receiving. In another example, icon 74 represents a transmitter only device 6 and is green when device 6 is transmitting and red when device 6 is not transmitting. Icon 73 represents the receiver device 8 and is green when it is receiving the signal and is red when not receiving the signal. Accordingly, icons 73, 74 provide an effective visual indicator on the display for viewing by the user that represents the current status of the measurement signal. This visual indicator will immediately inform the user that the lack of a signal must be addressed before moving on with measurement and/or realignment.

The icons 76, 77, 78, and 79 represent linear distances that are required for accurate alignment and correction calculations. Icon 76 represents the actual distance between the measurement devices, e.g., devices 6, 8. Icon 77 represents the actual distance between the center of the coupling between the shafts and the measurement unit associated with the moveable machine. Icon 78 represents the actual distance from the measurement unit associated with the moveable machine and the front support, foot or feet of the moveable machine. Icon 79 represents the actual distance from the front support, foot, or feet of the moveable machine and the rear support, foot, or feet of the moveable machine. Each of the icons 76, 77, 78, and 79 can be increased in size as the controller unit prompts the user to input the measured value. In the illustrated example icon 76 is enlarged to indicate to the user to perform the measurement. The enlarged icon can include an overlay of an indicator to select this icon. In the illustrated example, the overlay is a fingerprint. However, other indicators such as a flashing symbol or icon, or an arrow may be used. It is further noted that each of the icons 76, 77, 78, and 79 are shown with a question mark in the icon to indicate to the user that the distance data has not been entered. The distances represented by icons 76, 77, 78, and 79 displayed may not be shown to scale based on limitations of the display 25 and resource limitations, e.g., memory, computing power, power consumption, speed of desired display of data related to measurement and alignment.

Figure 3D:
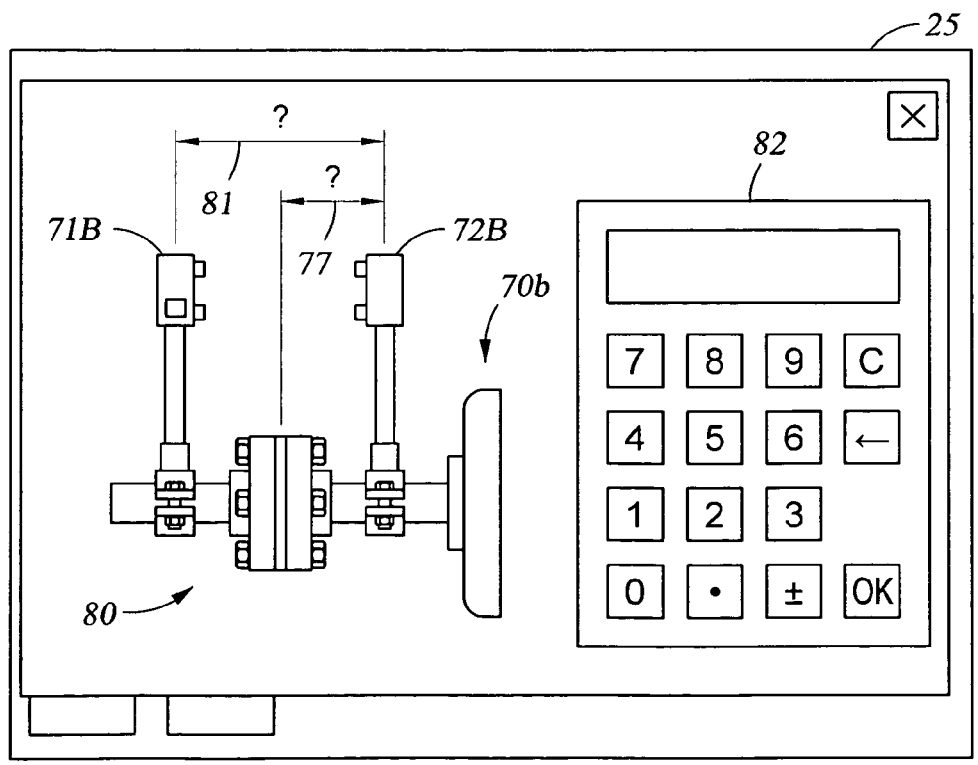

FIG. 3D shows a popup GUI that occurs on display 25 when the icon 76 was selected. Popup includes a machine, measurement, and input view 80 and a numerical input view 82. View 80 includes a two dimensional, elevational partial rendering 70B of the machine arrangement, a two dimensional, elevational renderings 71B, 72B of the measurement devices, and a two dimensional view of icon 77. View 80 provides enlarged views of each of these renderings compared to the prior GUIs. View 80 further shows icon 76 from FIG. 3C as a new icon 81 that indicates the same distance as icon 76 but in two dimensions and highlighted in some way to indicate to a user that this is the number that is to be input into the numerical input view 82. The indication can be a different color, flashing or blanking, and/or an audio tone. In the example, with a touch screen, the user types the distance into the controller unit by simply pressing the associated keys on the view 82 and thereafter pressing the OK icon.

Figure 3E:
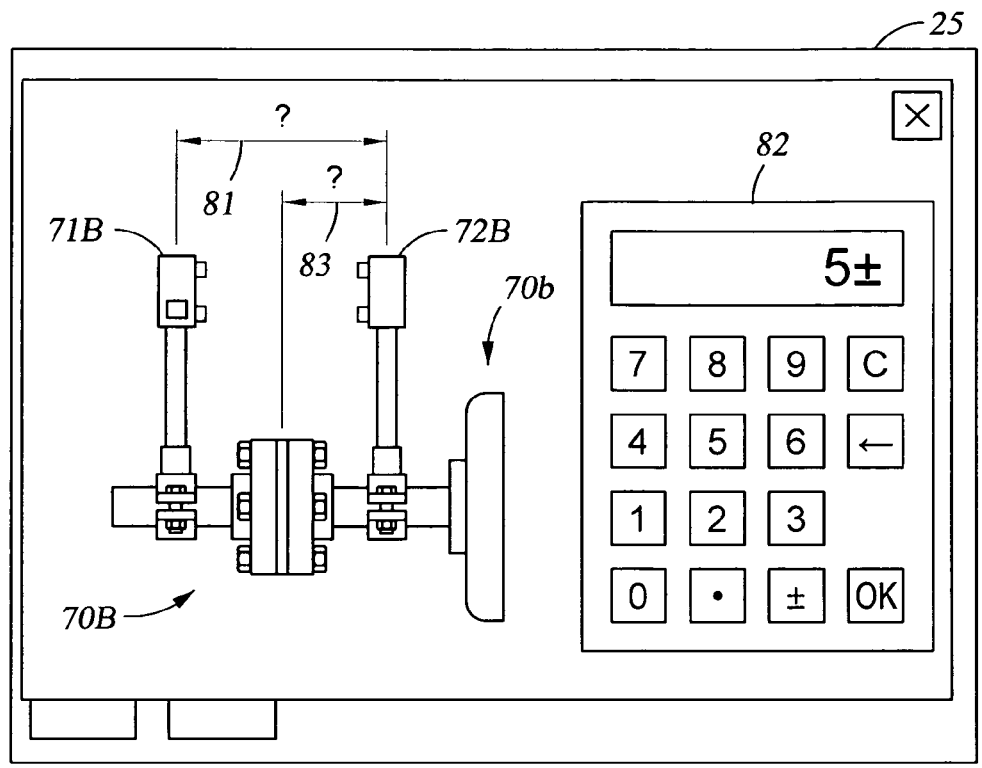

FIG. 3E shows a further view of the popup of FIG. 3D after the distance between the measurement devices, here shown as renderings 71B and 72B, is entered as described above with FIG. 3D. Icon 81 now shows the entered distance of 12, which can be in metric units or English units. A new icon 83 is displayed that indicates that the same distance as icon 77 but in two dimensions and highlighted in some way to Indicate to a user that this is the number that is to be input into the numerical input view 82. The indication can be a different color, flashing or blanking, and/or an audio tone. Other type if indication may be used. In the example, with a touch screen, the user types the distance into the controller unit by simply pressing the associated keys on the view 82 and thereafter pressing the OK icon. In the FIG. 3E illustrated example, the number 5 is entered into view 82 and after the OK icon is selected, then the number 5 will be displayed in icon 83.

Figure 3F:
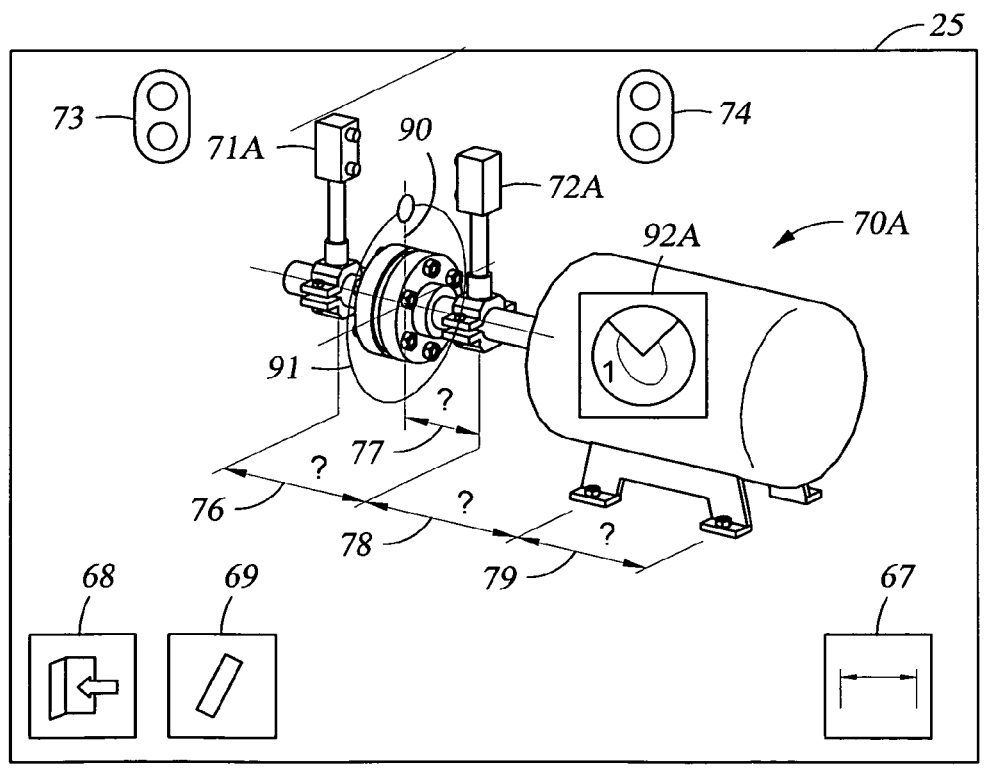

FIG. 3F shows a subsequent view of display 25 produced by the apparatus of the present invention and a further step in a method according to the present invention. This view returns to a view similar to that of FIG. 3C with renderings 70A, 71A, 72A as three dimension views, signal status icons 73, 74, and distance icons 76, 77, 78, 79 with the entered distance values shown as numbers and the non-entered distance values still showing as question marks or other non-entered indicia. Further information is displayed in the FIG. 3F display. A graphical representation or avatar 90 is displayed, which represents the radial position of the measurement icons 71A, and 72A and, hence, the actual real-time positions of at least one of the measurement devices 6, 8. The avatar 90 is a real-time display that will move when the measurement devices 6, 8 are moved, e.g., rotated with the respective shafts of the machines being measured and, possibly aligned. In an example, the processor 33 receives the positional data from an inclinometer in at least one of the measurement devices 6, 8 and updates the position of the avatar 90 in essentially real-time. The avatar 90 includes a body extending from the center of shafts in rendering 70A and a head at the radially outwardly end of the body. The head is colored to represent that a measurement can be taken or not where it currently is positioned. Examples of colors include green for measurement allowed and red for measurement prohibited. A transparent field of movement 91 for the avatar 90 is displayed in this view at the center of the coupling of the two shafts. In the illustrated view, the avatar 90 is at the vertical coordinate of the field 91. The field 91 is further rendered in three dimensions as a disk and shows the coordinate lines relative to the center axis of at least one of the shafts. While the field 91 is transparent such that it does not obscure the elements behind it in the three dimensional space, it is colored to represent areas or zones whereat a measurement can be taken for use with alignment calculations and whereat a measurement can not be taken for use with alignment calculations. As no measurement has been taken the entire field 91 is a single color indicating a measurement can be taken anywhere. In an example, the color is green for an allowable measurement area. In an example, the color is red for a prohibited measurement area.

The FIG. 3F display further includes icon 92A that represents to a user that a first measurement need be taken. Again, an indicia, such as an overlay on icon 92A indicates to the user that this icon should be selected next. The overlay is a fingerprint. Other indicia are with in the scope of the present disclosure. Icon 92A further indicates measurement area and a series of numbers. The numbers represent the number of measurements needed, here three, with the number of the current measurement being shown different than the others. In the present case the number 1 is in solid typeface indicating the current measurement. The numbers 2 and 3 are in outline form indicating that these measurement have not been taken or are not currently being taken. When the user selects the icon 92A, the controller unit 20 takes a position reading from the measurement devices 6, 8. This position reading is used to calculate the relative positions of the components under measurement. However, one reading is not enough to determine the vertical offset, horizontal offset, vertical angular error, and horizontal angular error. So a further measurement is required and the controller unit moves to a further function and step.

Figure 3G:
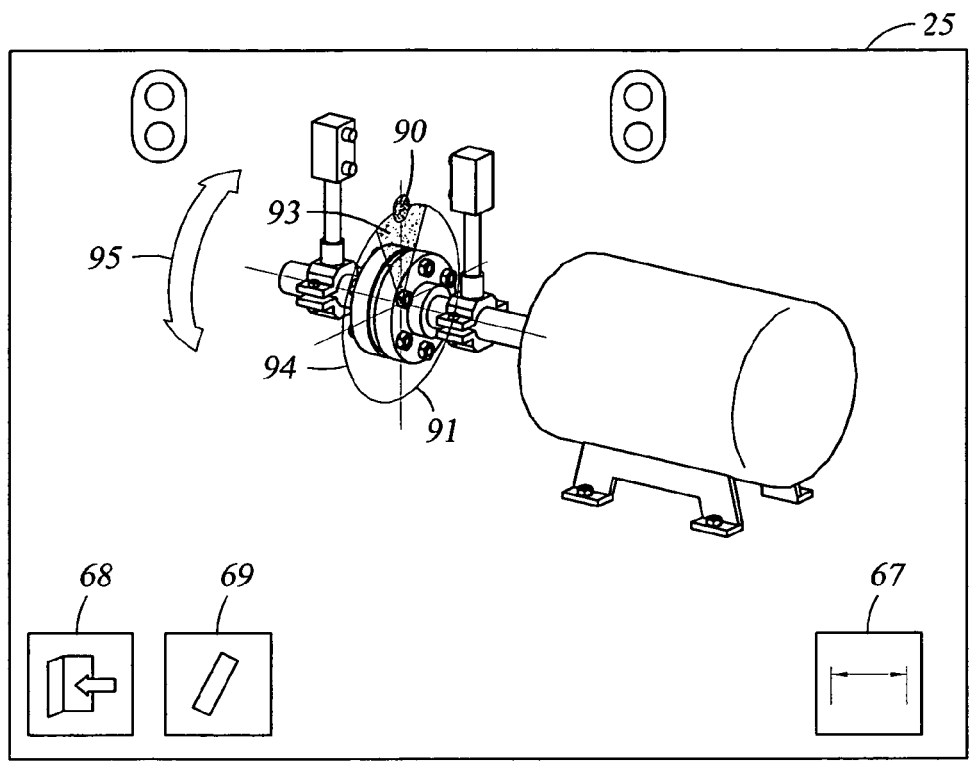

FIG. 3G shows a view of the display of the controller unit 20 after the FIG. 3F steps, measurements, and calculations are completed. The avatar 90 has changed to indicate to a user that it and the measurement devices 6, 8 it presents are not in a position for a useful measurement reading. Here, the head of avatar 90 has changed to red. The field 91 has also changed to a bifurcated view with a prohibited measurement area 93 and a permitted measurement area 94. These areas 93, 94 are displayed to the user as different and distinct areas. In an example, the areas 93, 94 can be different colors, e.g., green for permitted area 94 and red for prohibited area 93. In an example, the prohibited area 93 is show as opaque with the permitted area 94 remaining transparent. In another example, the prohibited area 93 may be cross-hatched whereas the permitted area 94 is not. The head of avatar 90 reflects the indicia of the area it is positioned in, either measurement prohibited area 93 or measurement allowed area 94. The measurement prohibited area 93 is calculated in the control unit 20, to be +/− a certain number of degrees from where the previous measurements where taken. The number of degrees depend on the distance between the measurement devices 6, 8. If the measurement devices 6, 8 are close together, then number of degrees is larger than if the measurement devices 6, 8 are far apart to ensure accurate calculations based on the measurement readings. In an example, the number of degrees is at least 15 degrees. In an example, the number of degrees is in a range of 15 to 30 degrees. In the illustrated example of FIG. 3G, the prohibited area 93 is +/−15 degrees from the vertical position whereat the first position measurement was taken. In an example, the user enters the distance between the measurement devices 6, 8.

The controller, based on this measurement, automatically selects the width or accurate length or the number of degrees that the prohibited area should be for the known distance between the measurement devices. The prohibited area increases as the measurement devices are positioned closer together. The prohibited area decreases as the measurement devices are moved farther apart. In an example, a function with an input of distance between measurement devices and a result of prohibited area size is stored in the controller unit, which calculates the prohibited area size, e.g., +/−Y degrees upon receiving the distance between measurement devices. In this example, the size of the prohibited area can be a continuous variable. In an example, a plurality of discrete values for the prohibited area are stored, for example, in a lookup table, and related to a range of distances. When the distance falls into a range, the a discrete value for the prohibited area is selected.

A directional arrow icon 95 is also displayed by the controller unit 20. The icon 95 instructs the user to rotate the measurement devices 6, 8 by rotating the shafts. It is preferred to not release the measurement devices 6, 8, during a measurement process.

Of further note with regard to FIG. 3G, is that the icon 67 is displayed without the line through, see the discussion above, e.g., with regard to FIG. 3C. Accordingly, the distance icons 76, 77, 78, 79 are not shown in the FIG. 3G GUI view. As discussed herein, if the user again selects this icon, then the distance Icons 76, 77, 78, 79 would be shown again as in the FIG. 3H.

Figure 3H:
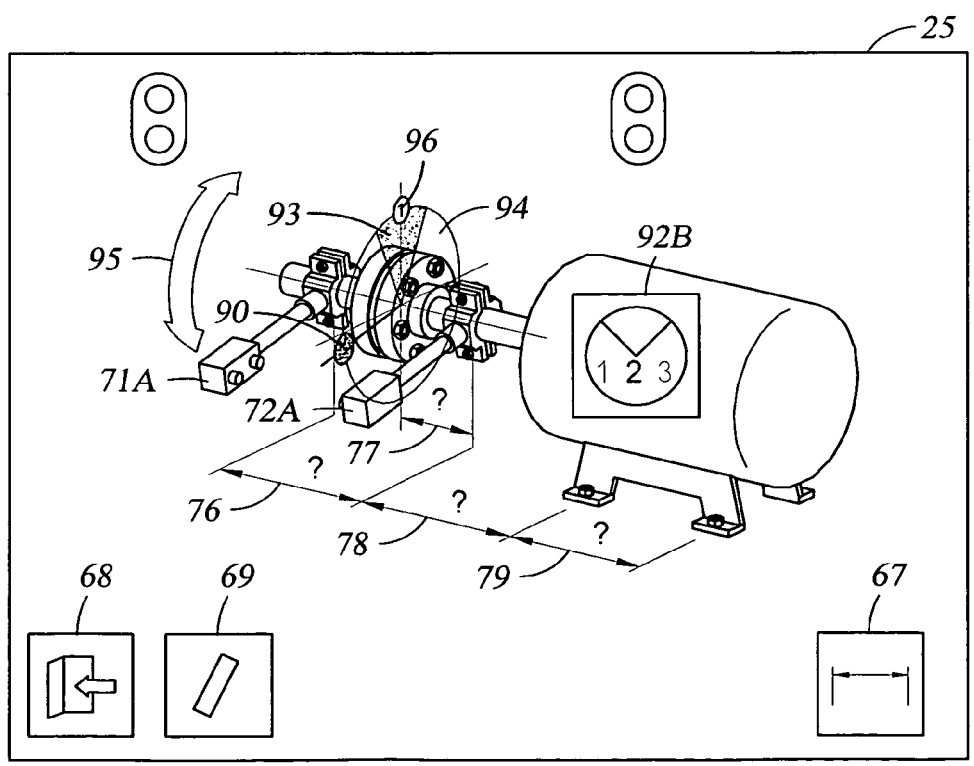

FIG. 3H shows a further display of the controller unit. Icon 92B is now shown, which represents to a user that an action needs to be taken. Again, an indicia, such as an overlay on icon 92B indicates to the use that this icon should be selected next. The overlay is a fingerprint. Other indicia are with in the scope of the present disclosure. Like icon 92A, icon 92B further indicates a measurement area and a series of numbers. The numbers represent the number of measurements needed, here three, with the number of the current measurement being shown different than the others. In the present case the number 2 is in solid typeface indicating a current measurement. The numbers 1 and 3 are in outline form indicating that these measurements are not the current measurement. When the user selects the icon 92C, the controller unit 20 takes a position reading from the measurement devices 6, 8. This position reading is used to calculate the relative positions of the components under measurement. However, in some applications, this second reading is not enough to determine the vertical offset, horizontal offset, vertical angular error, and horizontal angular error. So a further measurement is required and the controller unit moves to a further function and step.

A further new icon 96 is shown in the controller unit display of FIG. 3H. This icon represents the position of the first measurement reading, e.g., the reading discussed above with FIG. 3F.

As readily apparent in FIG. 3H, the icons 71A, 72A, as well as avatar 90, have rotated to the left (counter clockwise) relative to the prior position shown in FIGS. 3C, 3F, and 3G. Icons 71A, 72A and avatar 90 are rotated in real time as the measurement devices 6, 8 are rotated with the shafts. The user while rotating the components under measurement, e.g., shafts, can view the movement of the Icons 71A, 72A and avatar 90. Moreover, the user will see how far the measurement devices must move to move into the allowable measurement area 94. Accordingly, there is no guess work on the part of the user as the controller informs the user of when the actual components under measurement are in position for a further measurement by the position if the avatar 90 in the field 91, Additionally, the head of the avatar 90 changes to a measurement permitted indicia when the avatar 90 moves in to the permitted area 94. This coordination of the movement of the icons and avatar works to inform the user and reassure the user that the device is reading the position correctly and that the proper measurement steps are being taken.

Figure 3I:
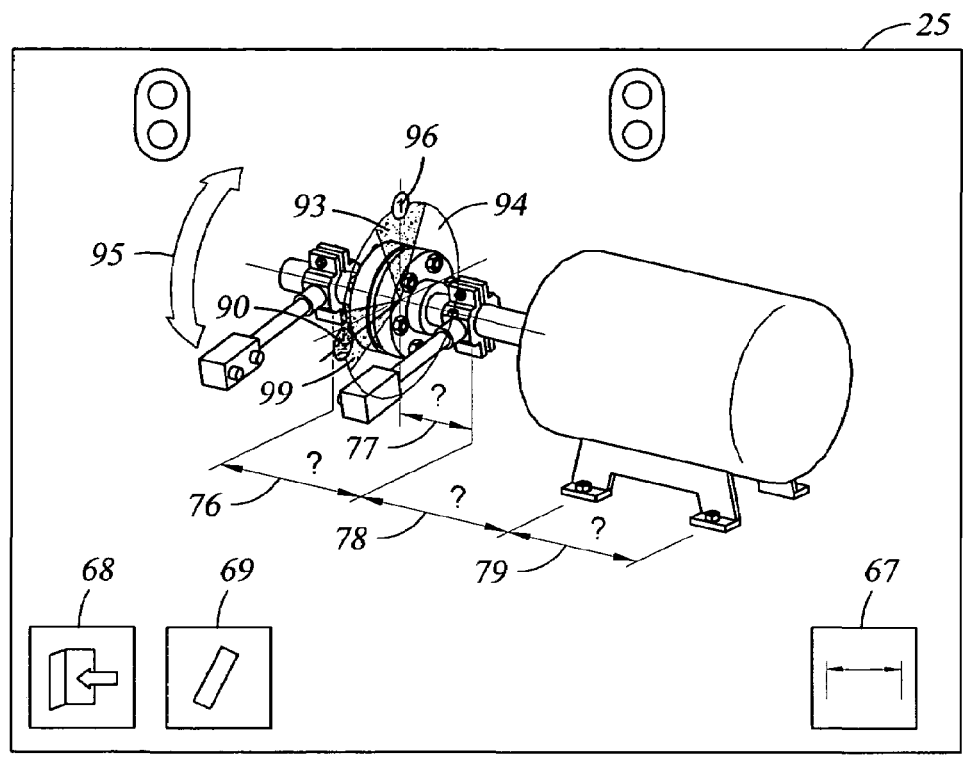

FIG. 3I shows a further display of the controller unit after a further measurement reading Is taken. The head of avatar 90 now indicates that a valid reading can not now be taken at this position. Further a second measurement prohibited area 99 is displayed in field 90 The prohibited area 99 substantially similar to prohibited area 93 but it is centered on the current reading location, e.g., on the avatar 90. In this example, the icon 95 remains to indicate to the user the measurement devices must be further rotated for another measurement.

Figure 3J:
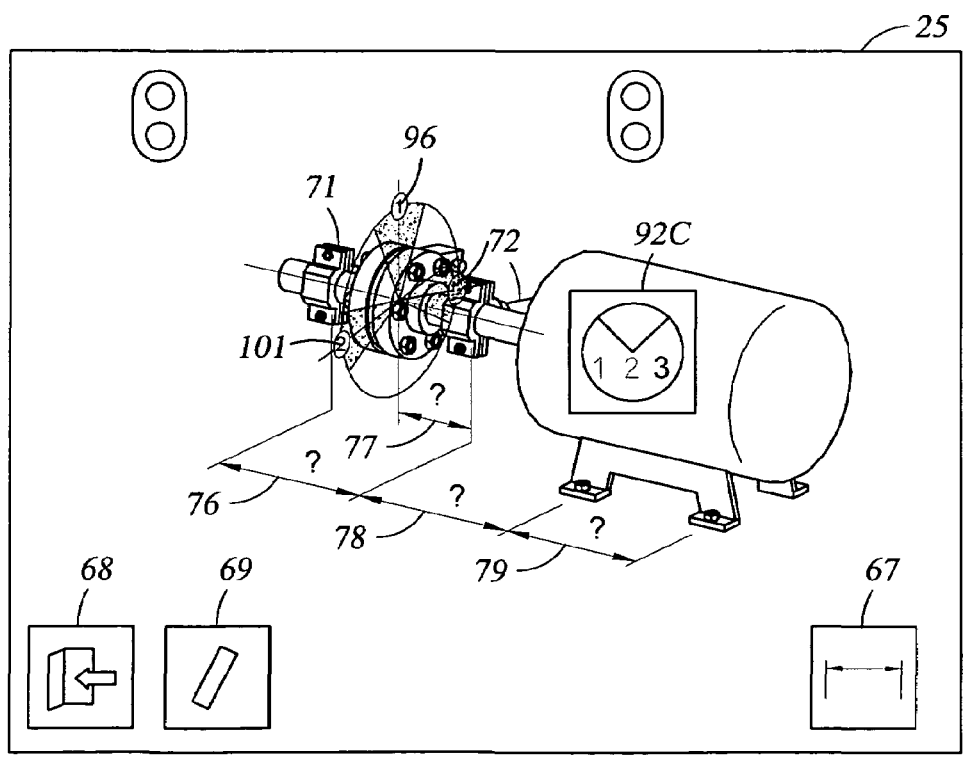

FIG. 3J shows a further display of the controller unit. Icon 92C is now shown, which represents to a user that an action needs to be taken. Again, an indicia, such as an overlay on icon 92C indicates to the use that this icon should be selected next. The overlay is a fingerprint. Other indicia are with in the scope of the present disclosure. Like icons 92A and 92B, icon 92C further indicates a measurement area and a series of numbers. The numbers represent the number of measurements needed, here three, with the number of the current measurement be shown different than the others. In the present case the number 3 is in solid typeface indicating a current measurement. The numbers 1 and 2 are in outline form indicating that these measurements are not the current measurement, the numbers 1, 2, and 3 represent the measurements to be taken at each location and can be represented by avatars 96, 101, and 90. When the user selects the icon 92C, the controller unit 20 takes a position reading from the measurement devices 6, 8. This position reading is used to calculate the relative positions of the components under measurement. However, in some applications, this third reading is the final reading needed to calculate the alignment errors such as vertical offset, horizontal offset, vertical angular error, and horizontal angular error. So a further measurement is not required and the controller unit may move on to an alignment calculation function and step.

While the present disclosure explicitly discusses three readings as an example, it will be understood that other embodiments of the present invention are not limited to three measurements. It is within the scope of the present inventions to measure at four or more locations. With additional measurements for use in the calculation, the prohibited measurement areas may be made smaller. It is also within the scope of the present invention to on a continual basis whenever the measurement devices are in an allowed position, which is shown by the avatar 90 being positioned in the allowed area 94 of field 91.

Figure 3K:
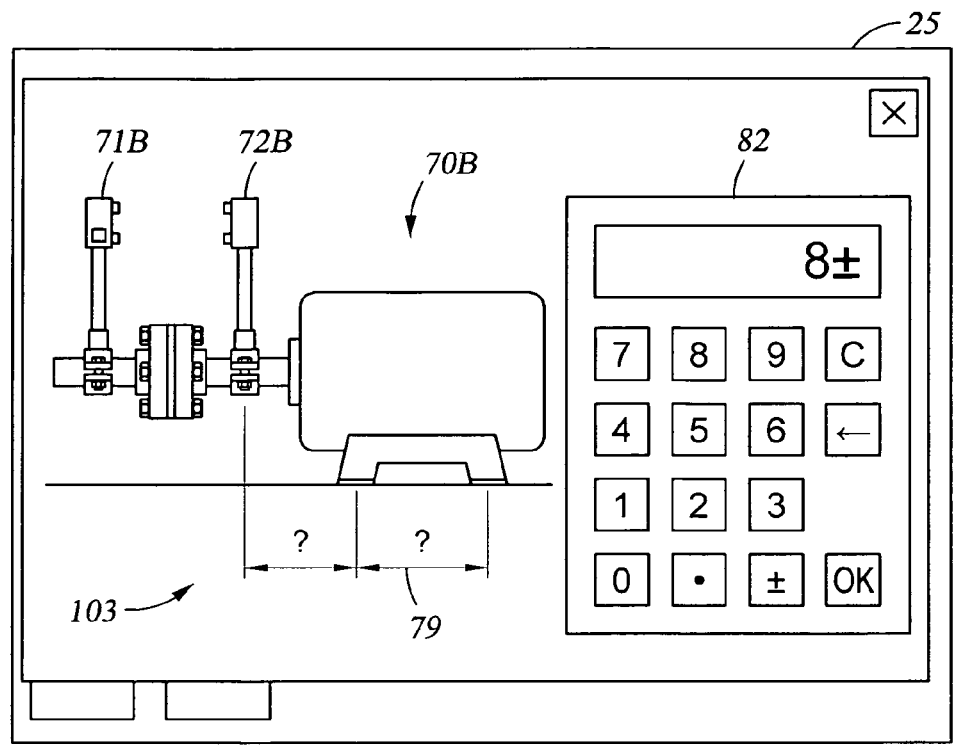

FIG. 3K shows a further display 25 of the controller unit. In this display, the controller unit is requesting further data required for calculation of the alignment of the components. The numerical input view 82 is again displayed. A two dimensional, elevational rendering 70B of the machine arrangement and a two dimensional, elevational renderings 71B, 72B of the measurement devices are also shown. These are enlarged relative to the prior view. A two dimensional view of distance icon 79 is also shown. This view further includes an input distance icon 103 that corresponds to the distance icon 78 representing the distance from the measurement device to the front foot of the moveable machine. Icon 103 indicates the same distance as icon 78 but in two dimensions and highlighted in some way to indicate to a user that this is the number that is to be input into the numerical input view 82. The indication can be a different color, flashing or blanking, and/ or an audio tone. In the example, with a touch screen, the user types the distance into the controller unit by simply pressing the associated keys on the view 82 and thereafter pressing the OK icon.

Figure 3L:
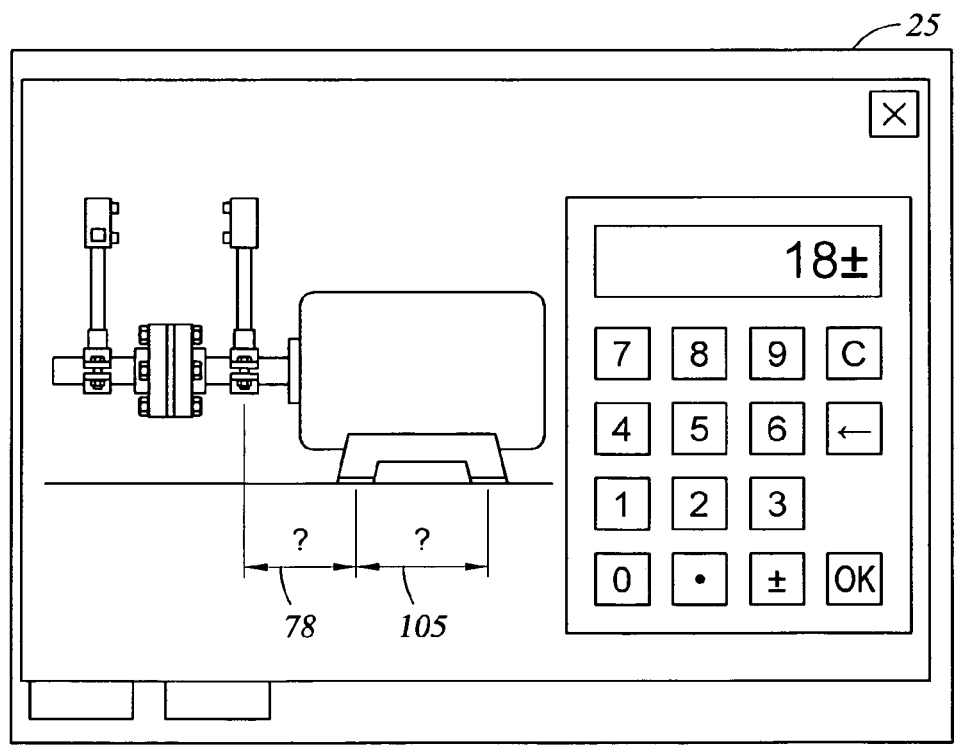

FIG. 3L shows a further display 25 of the controller unit, which is similar to that of FIG. 3K. In this display, the controller unit is requesting further data required for calculation of the alignment of the components. The numerical input view 82 is again displayed. A two dimensional view of distance icon 78 is shown with the actual entered data corresponding to the distance. This view further includes an input distance icon 105 that corresponds to the distance icon 79 representing the distance from the front foot of the moveable machine to the rear foot of the moveable machine. Icon 105 indicates the same distance as icon 79 but in two dimensions and highlighted in some way to indicate to a user that this is the number that is to be input into the numerical input view 82. The indication can be a different color, flashing or blanking, and/or an audio tone. In the example, with a touch screen, the user types the distance into the controller unit by simply pressing the associated keys on the view 82 and thereafter pressing the OK icon.

The above processes, steps, measurements and graphical user interfaces provide the controller with the data needed to calculate the alignment errors, if any. The controller unit 20 is programmed to automatically proceed and calculate the alignment errors. Once the alignment errors are calculated, the controller moves to an alignment correction function, which is illustrated in the displays or graphical user interfaces of FIGS. 4A-4E.

Figure 4A:
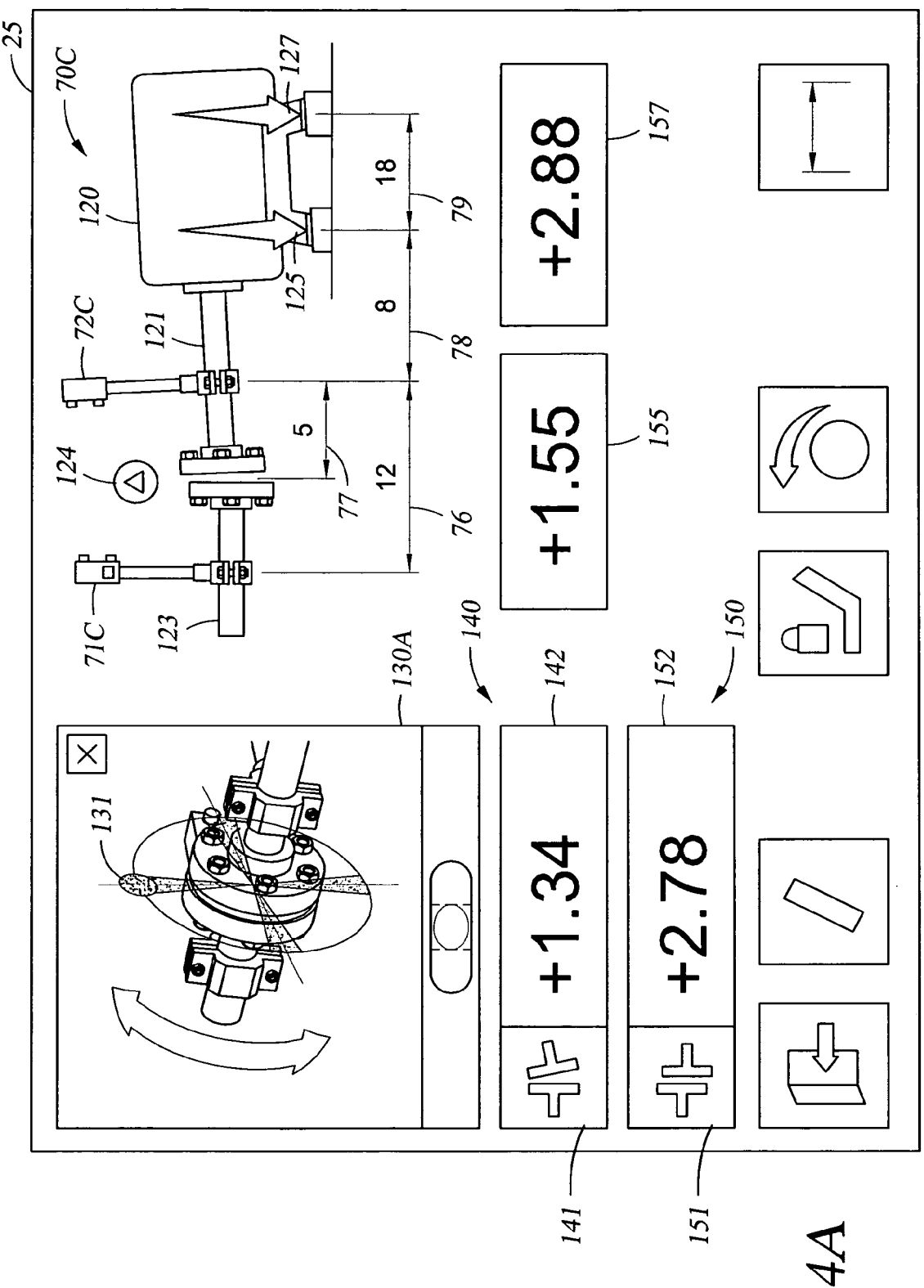
FIGS. 4A-4E show a sequence of graphical user interfaces that demonstrate steps in a method according to various embodiments of the present invention.

FIG. 4A further shows a plurality of data windows 140, 150, 155, and 157, which present data relating to the alignment of the components under measurement. The data is usually calculated data as determined by the controller unit based on the measured values and input distances from prior operations. Data window 140 includes an icon 141 that indicates that this data window relates to angular offset and a numerical readout 142 that provides the calculated data relating to the angular offset. The calculated data is provided so that the angular offset can be checked by the user as a spot check and this offset over time since the last realignment can be tracked. Icon 141 shows a representation of the two shafts and their associated coupling at an angle on a background. The background can be shaded to identify the degree of angular offset. The background can also be colored to further draw the user attention to the degree of angular offset. In an example, the background within the icon can be white if the angular offset is within tolerance. It can be orange if angular offset is slightly outside tolerance. It can be red if the angular offset is beyond the orange level of offset. Moreover, the icon 141 provides representation of the two components to be aligned, here, shafts. The representation of the shafts can be moved apart to represent the angular offset. Moreover, the angle between the shaft representations can be made more severe if the angular offset is great and made less if the angular offset is small. In an example, the left shaft representation is fixed. The right shaft representation is has its bottom moved away from the left shaft. This accurately shows the vertical angular offset of FIG. 4A. This further coincides with the calculated adjustment values in windows 155, 157 and the value in window 142. That is the rear of the machine (120) is higher than the front of the machine and accordingly, the bottom of the moveable shaft is pivoted away from the fixed shaft, which is also shown by the shafts 121, 123. It will be recognized that the inverse will also be shown by icon 141. In this case, the machine front would be higher than the machine rear. As a result the top of the moveable shaft will move away from the fixed shaft. The icon 141 would then appear flipped top to bottom as it is currently shown.

The rendering 70C further illustrates the calculated alignment errors by moving the view of the moveable machine in the direction of the offset. The calculated offset for the machine front support and machine rear support are shown below the machine view in window 155, 157. These values are used to shift the machine upwardly with reference to FIG. 4A. Here the rear support is shifted upwardly more than the front support. Accordingly, the shaft 121 is shown offset upwardly and at an angle with respect to the fixed shaft 123. As the actual machine is aligned, the view of the machine on display 25 will also change as the alignment errors are corrected in the vertical plane.

FIG. 4A further shows a sub-display 130A that indicates the present position of the measurement devices 6, 8. This sub-display may be removed, if desired, by selected the delete X in the upper right portion. Here, the avatar 131 representing position of the measurement devices is shown in the vertical position. With the avatar 131 in the vertical position as shown, the display automatically shows the elevational view of the power transfer arrangement with the calculated alignment errors and the correction directions, if needed. Sub-display further includes a disk showing the movement plane of the avatar as well as the positions whereat the measurement devices, and avatar, should not be positioned, a smaller area whereat it is acceptable for the measurement devices to be positioned, and an even smaller area centered at the zero degree, 90 degree, 180 degree and 270 degree positions where it is preferred to have the measurement devices 6, 8 during adjustment or realignment. The smaller area is set at +/−six degrees from the zero degree, 90 degree, 180 degree and 270 degree positions. The even smaller area is set at +/−three degrees from the zero degree, 90 degree, 180 degree and 270 degree positions.

In an example, the sub-display 130A shows when the display will change from a elevational display (FIG. 4A) for correction of vertical alignment errors to a top, plan display (FIG. 4D) for correction of horizontal alignment errors. When the measurement device and the associated avatar 131 cross the halfway point between any of the zero degree, 90 degree, 180 degree and 270 degree positions the display changes to the other view. Accordingly, the user need only move the measurement device to cause a change in view of the controller. That is, the controller display is automatically synced with the position of the measurement device.

FIG. 4A further shows a plurality of data windows 140, 150, 155, and 157, which present data relating to the alignment of the components under measurement. The data is usually calculated data as determined by the controller unit based on the measured values and input distances from prior operations. Data window 140 includes an icon 141 that indicates that this data window relates to angular offset and a numerical readout 142 that provides the calculated data relating to the angular offset. The calculated data is provided so that the angular offset can be checked by the user as a spot check and this offset over time since the last realignment can be tracked. Icon 141 shows a representation of the two shafts and their associated coupling at an angle on a background. The background can be shaded to identify the degree of angular offset. The background can also be colored to further draw the user attention to the degree of angular offset. In an example, the background within the icon can be white if the angular offset is within tolerance. It can be orange if angular offset is slightly outside tolerance. It can be red if the angular offset is beyond the orange level of offset. Moreover, the icon 141 provides representation of the two components to be aligned, here, shafts. The representation of the shafts can be moved apart to represent the angular offset. Moreover, the angle between the shaft representations can be made more severe if the angular offset is great and made less if the angular offset is small. In an example, the left shaft representation is fixed. The right shaft representation is has its bottom moved away from the left shaft. This accurately shows the vertical angular offset of FIG. 4A. This further coincides with the calculated adjustment values in windows 155, 157 and the value in window 142. That is the rear of the machine is higher than the front of the machine and accordingly, the bottom of the moveable shaft is pivoted away from the fixed shaft, which is also shown by the shafts 121, 123. It will be recognized that the inverse will also be shown by icon 141. In this case, the machine front would be higher than the machine rear. As a result the top of the moveable shaft will move away from the fixed shaft. The icon 141 would then appear flipped top to bottom as it is currently shown.

Data window 150 is similar to data window 140 except it is directed to vertical offset as this view is the elevational view. Icon 151 includes indicia such as color to indicate whether the vertical offset is within tolerance, outside of tolerance, or greatly outside tolerance. The background or fill of icon 151 can represent the value of the vertical offset. For example, white can be within tolerance, orange can be outside of tolerance and red can be greatly outside tolerance.

As shown in FIG. 4A the alignment icons 141, 151 include white representations of the components against a colored background. The colored background coded to indicate the degree of error. If the error is great then a red background is used. If the error is less than the background is orange or less red. When the error is corrected, the background will be set to white with a colored depiction of the components. For example, the components can be green against a white background when the icon 141, 151 represents an aligned vertical angular error or aligned vertical offset. Moreover, then the real world components are aligned then the representation of the components in the icon 141, 151 are also aligned. Accordingly, the icons 141, 151 represent alignment errors and alignment with inverse color coding, and moving the component representations in the icon by the determined offset.

Data window 155 shows the numerical value that the front feet or support of the moveable machine are offset. This number is shown as a positive number in the illustrated example. Accordingly, the arrow icon 125 points downwardly as the front support should be reduced to correct for the calculated offset. Data window 157 shows the numerical value that the rear feet or support of the moveable machine are offset. This number is shown as a positive number in the illustrated example. Accordingly, the arrow icon 127 points downwardly as the rear support should be reduced to correct for the calculated offset.

It is appreciated that the data windows 140, 150, 155, and 157 all relate to data in the vertical or elevational plane, which is why this view shows the arrangement under measurement in the elevation view 70C. Moreover, the numbers in windows 142, 152, 155, and 157 are constantly updated during realignment. Thus the user can watch the numbers change as the movable machine is shimmed, or other wise moved. The arrow icons 125, 127 are also constantly adjusted. Further, the coloring of the fill or background of icons 141, 151 are also adjusted depending on the currently measured position of the measurement devices. Still further the relative positions of the component representations in icons 141, 151 are also moved relative to each to represent the actual alignment errors.

Figure 4B:
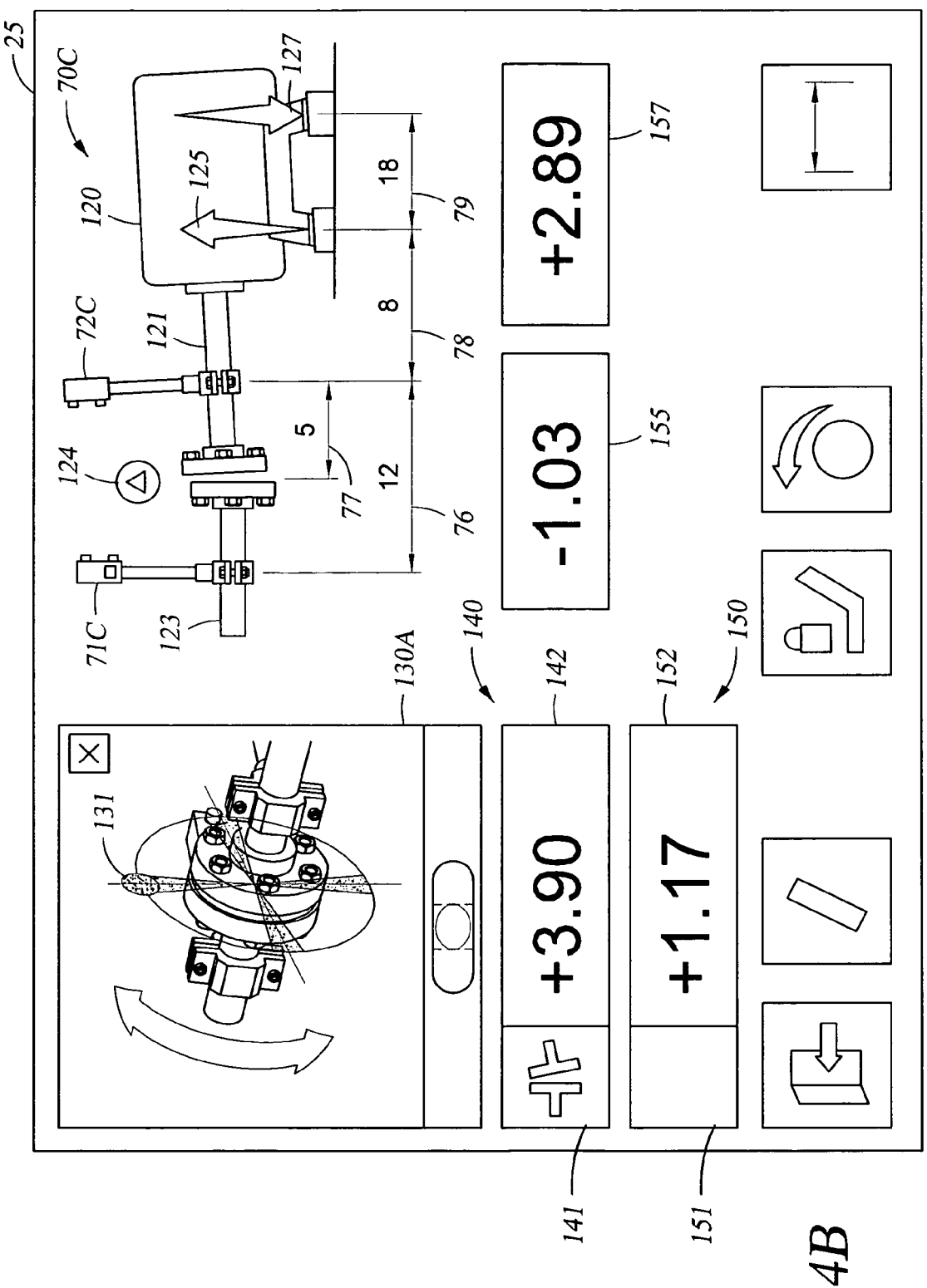

FIG. 4B shows a view similar to FIG. 4A, however, different measurement values were provided to the controller unit 20 as a result different alignment values were calculated. Here, it was determined that the front of the machine is too low, see the negative number in data window 155. Additionally, the arrow icon 125 points in the upward direction, which informs the user to raise the front of the machine.

Figure 4C:
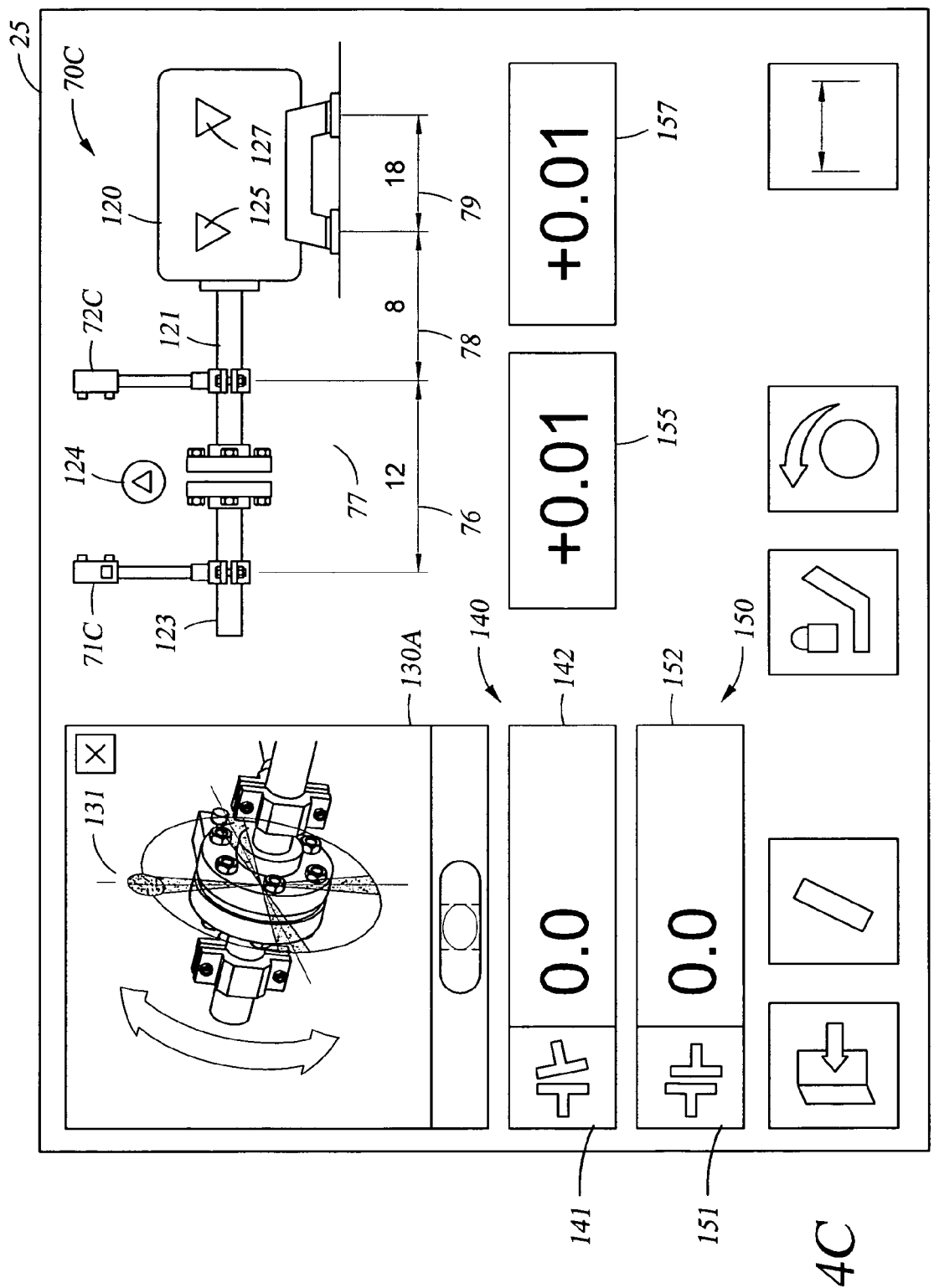

FIG. 4C shows a view similar to FIG. 4A and FIG. 4B, however, the alignment corrections have been carried out. As a result, the arrow icons 125, 127 are reduced to just arrowheads with no bodies. The icons 141, 151 now indicate that the components are within tolerances by at least one of the background or fill matches the adjacent numerical window 142, 152, respectively or the actual alignment of the shafts shown in the Icons 141, 151 themselves. For example, the angle between the two shafts in the icon 141 of FIG. 4C is less than the angle of between the two shafts of the icon in FIG. 4B. Icons, 141, 151 are shown colored as an inverse of the icons shown in FIGS. 4A and 4B. Here the representation of the shafts is colored whereas the background is now white. In an example, the color of the shafts is green. Moreover, the angle between shafts of icons 141 is greatly reduced compared to prior icons 141. A slight angle is still shown to remind the user that this icon and associated data window is for angular error. The vertical offset of the shafts of icon 151 is greatly reduced compared to prior icons 151.

As a further way for the controller unit to highlight the alignment is that an all clear icon 224 replaces the alert icon 124 of FIGS. 4A and 4B.

Figure 4D:
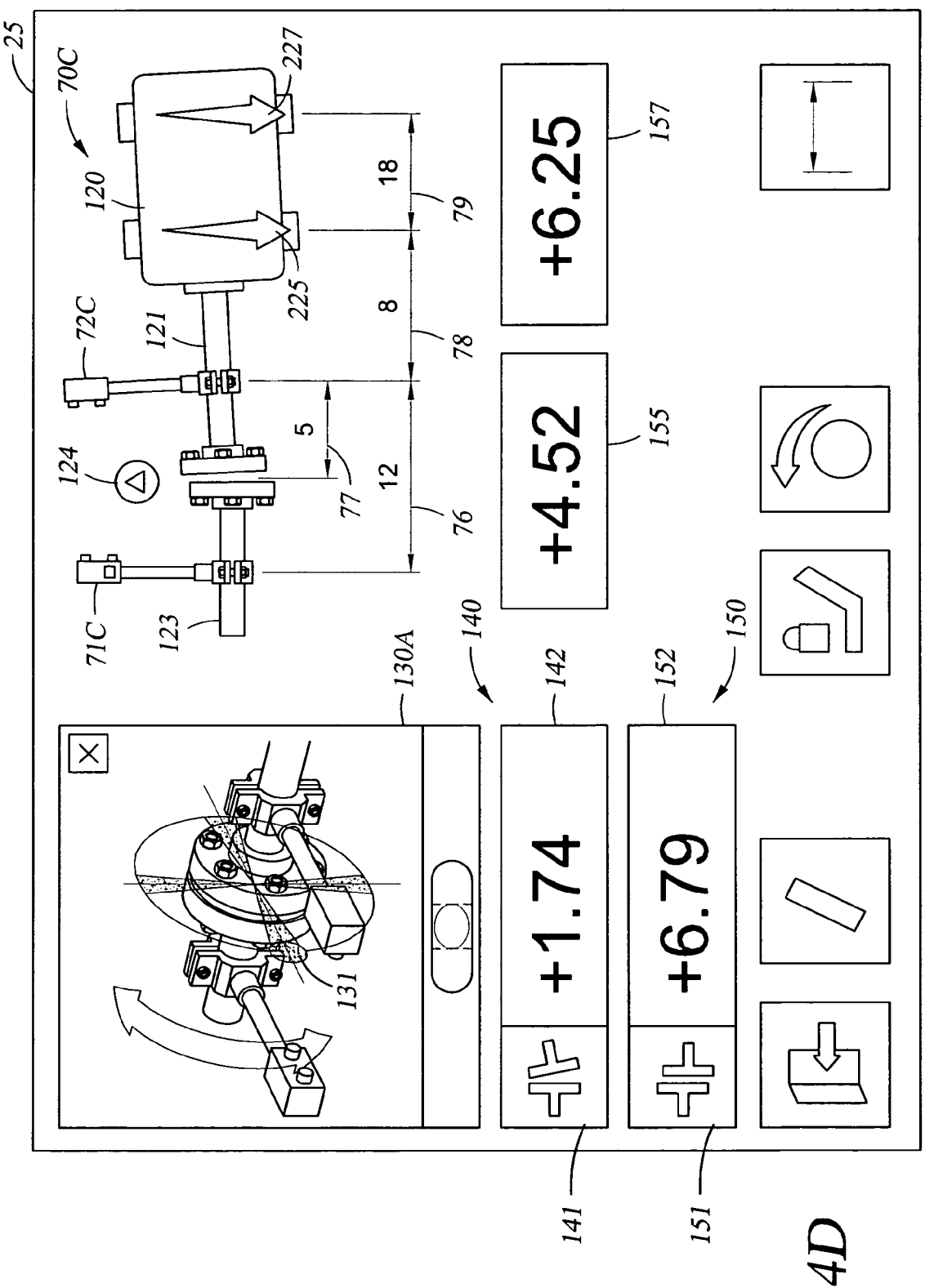

FIG. 4D shows a view of an alignment calculation similar to FIG. 4A but with reference to the horizontal plane. A top, plan view 70D of the components under measurement, here, a moveable machine with shaft 121 and an adjoining shaft 123 are shown in a top view. It is noted that alignment errors were found based on the measurements and the rendering 70D graphically illustrates the errors to the user by the misalignment of the shafts 121 and 123 and the moveable machine associated with the shaft 121. It is further noted that the measurement device icons 71C and 72C are shown in a horizontal position. A further user attention icon 124 is provided at the coupling or decoupling of the shafts 121, 123 to further highlight the alignment errors to the user. Additional graphical icons 225, 227 are provided on the display generally aligned with the front support or feet and rear support or feet of the machine. Icons 225, 227 are the same as icons 125, 127 except icons 225, 227 represent movement in the horizontal plane. That is, icon 225 is in the form of an indicator that represents the direction and magnitude of the adjustment necessary for the front feet to correct alignment errors. In this example, the icon 225 is in the form of an arrow. This arrow icon 225 can be made larger or smaller depending on the magnitude of the adjustment for the front feet. Icon 225 as shown represents a middle magnitude adjustment and, hence can be made larger or smaller than shown. This arrow icon 225 further indicates a direction, i.e., it points upwardly or downwardly depending on the direction of the adjustment required. Here, icon 225 points downwardly. Accordingly, the front feet must be moved toward the user or leftwardly relative to a person standing behind the machine remote from the shaft 121. The rear icon 227 is also in the form of an arrow and likewise indicated magnitude by its size and direction by its arrow head pointing. These icons 225, 227 are automatically and in real-time updated as the user adjusts the movable component or machine. In an example, the controller unit 20 receives updated data from the measurement sensors 6, 8. The controller unit 20 updates its calculations and if the magnitude or direction of the adjustment of either the front feet or rear feet changes, then the icons 225, 227 are changed. It is further within the present scope to indicate the magnitude of change using other indicia such as color or audio signals.

FIG. 4D further shows the plurality of data windows 140, 150, 155, and 157, which present data relating to the alignment of the components under measurement like FIG. 4A except that the data relates to the horizontal plane. Window 140 includes an icon 141 that is the same as described herein except it represent horizontal angular error. It is color coded and has angularly offset representations of components. Window 150 includes icon 151 that is the same as described herein expect it represents horizontal offset. It is color coded and has offset representations of components.

FIG. 4D further shows a sub-display 130A that indicates the present position of the measurement devices 6, 8. This sub-display 130A is similar to sub-display described above with regard to FIG. 4A but the avatar 131 representing position of the measurement devices is shown in the horizontal position. With the avatar 131 in the horizontal position as shown, the display automatically shows the top, plan view of the power transfer arrangement with the calculated alignment errors and the correction directions, if needed, for the horizontal plane.

Figure 4E:
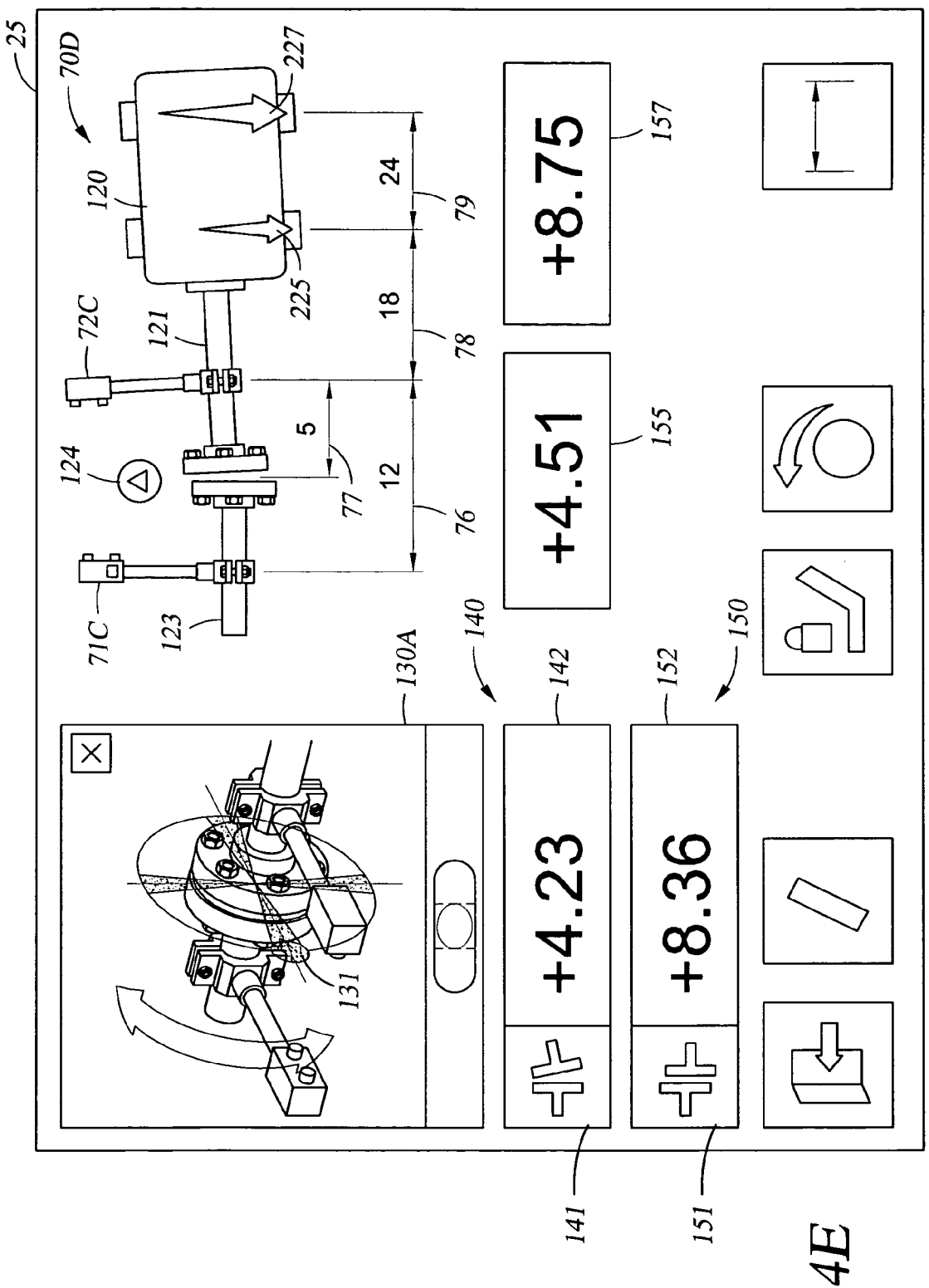

FIG. 4E is provided to illustrate that the icons 125, 127, 225, or 227 can be increased in size. Here icon 227 is increased in size as the rear of the machine must be moved downwardly relative to the view 70D. Once the rear of the machine is moved down, the icon 227 will change to the size as shown in FIG. 4D and eventually either be erased or only be the size of icon 127 as shown in FIG. 4C. It is within the scope of the present disclosure to provide any of the icons 125, 127, 225, 227 with any of the displays.

Figure 5:
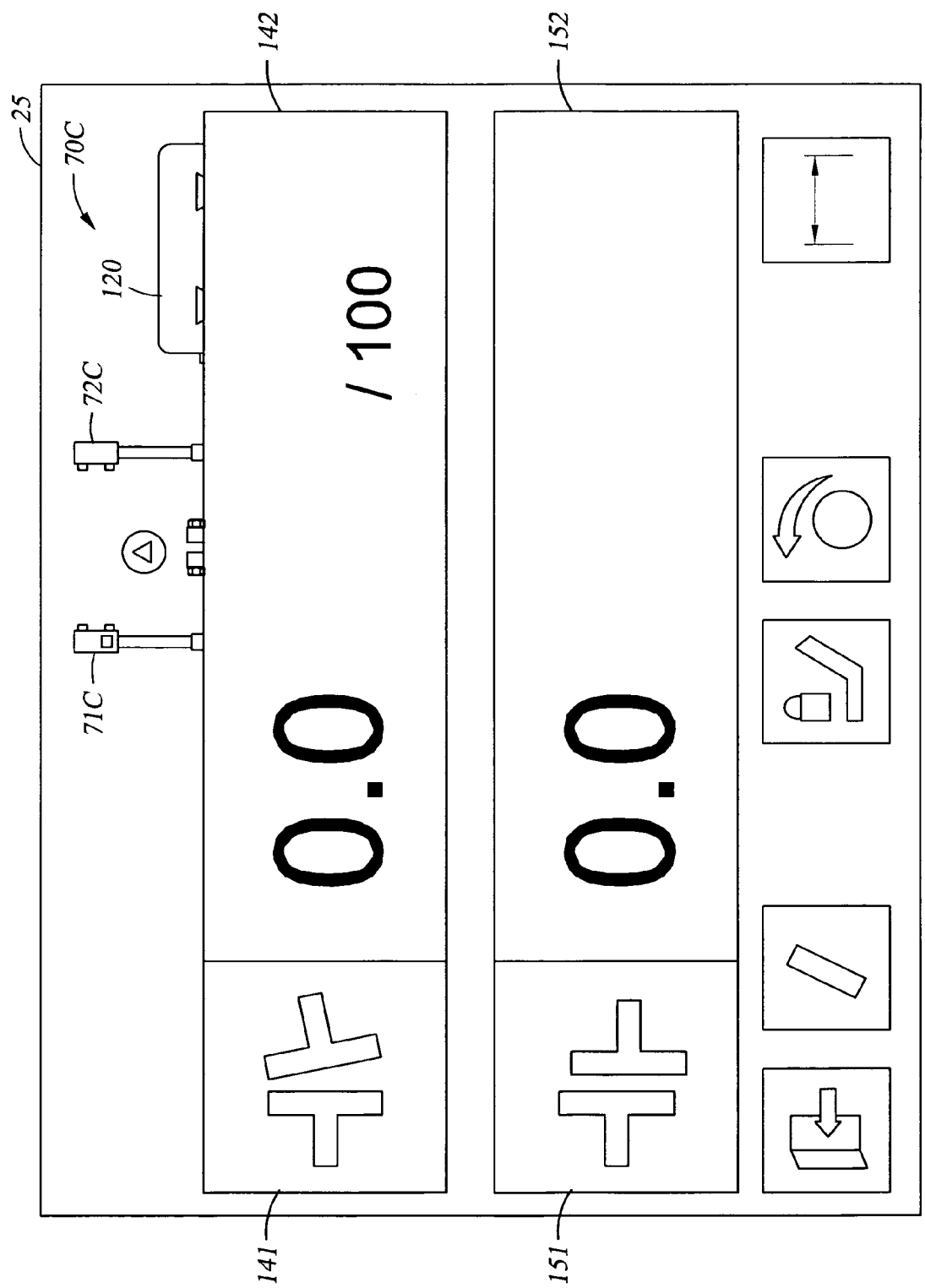
FIG. 5 shows a graphical user interface that demonstrates an embodiment of the present invention.

FIG. 5 shows a further view of data windows 140, 150 that have been increased in size such that they almost entirely cover the display as was shown in FIG. 4C. The user can select this type of view at any time during the alignment phase. Simply by selecting these windows for enlargement. Moreover, the size of the data windows 140, 150, when graphically indicating horizontal misalignment, can reducing size of the horizontal misalignment window or graphic when there is no change in a reading from the alignment measurement device for a select period of time.

Figure 6:
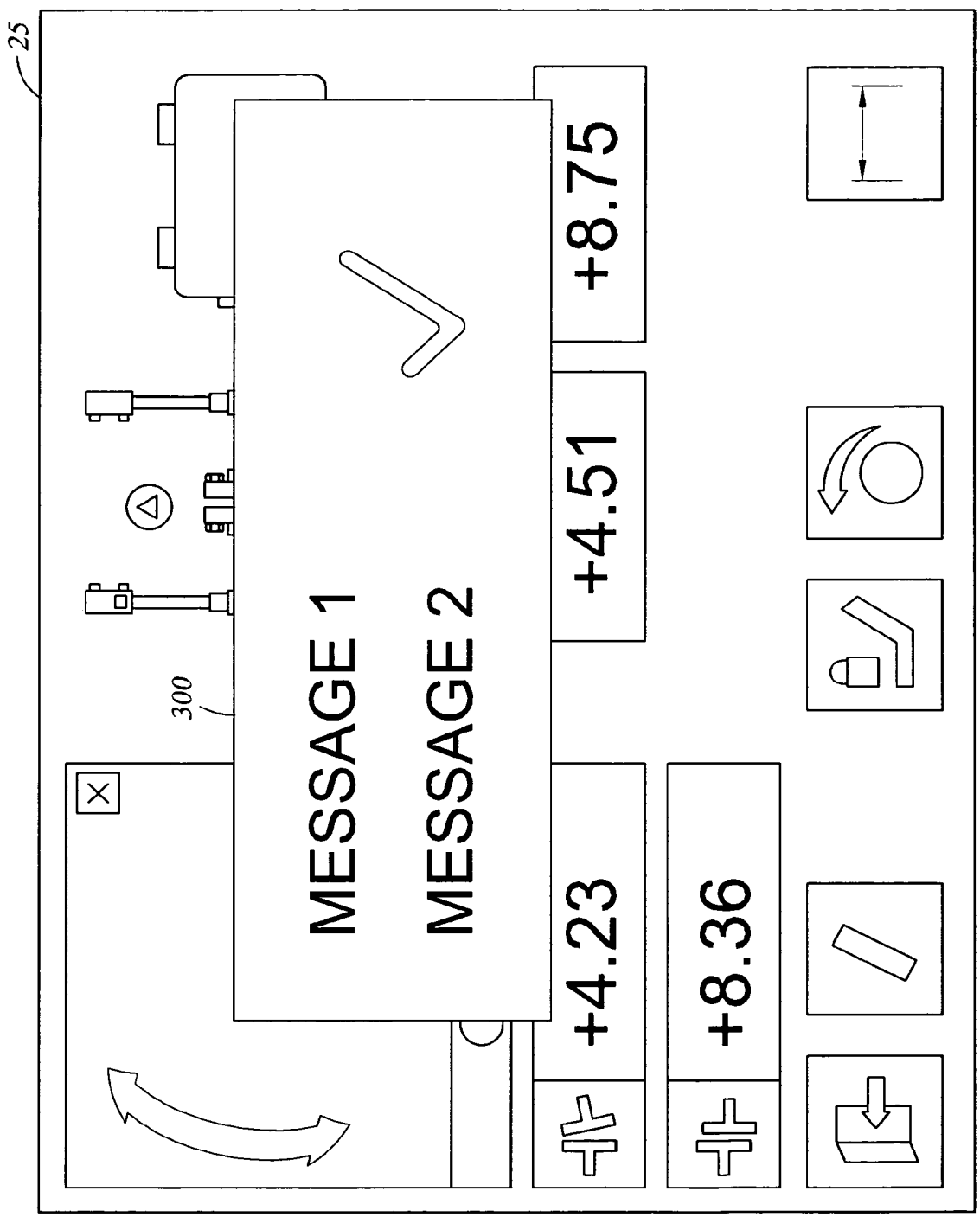
FIG. 6 shows a graphical user interface that demonstrates an embodiment of the present invention.

FIG. 6 shows graphical user interface that is similar to FIGS. 4A-4D but with a popup window 300. The popup window 300 displays a text message indicating that the alignment is complete and includes graphics that indicate alignment is complete, e.g., a green check mark. The popup window 300 is automatically displayed when the alignment of the components is within tolerance limits to alert the technician to stop adjusting and/or moving the components. The popup window message may further prompt the technician to save the results for later analysis.

Figure 7:
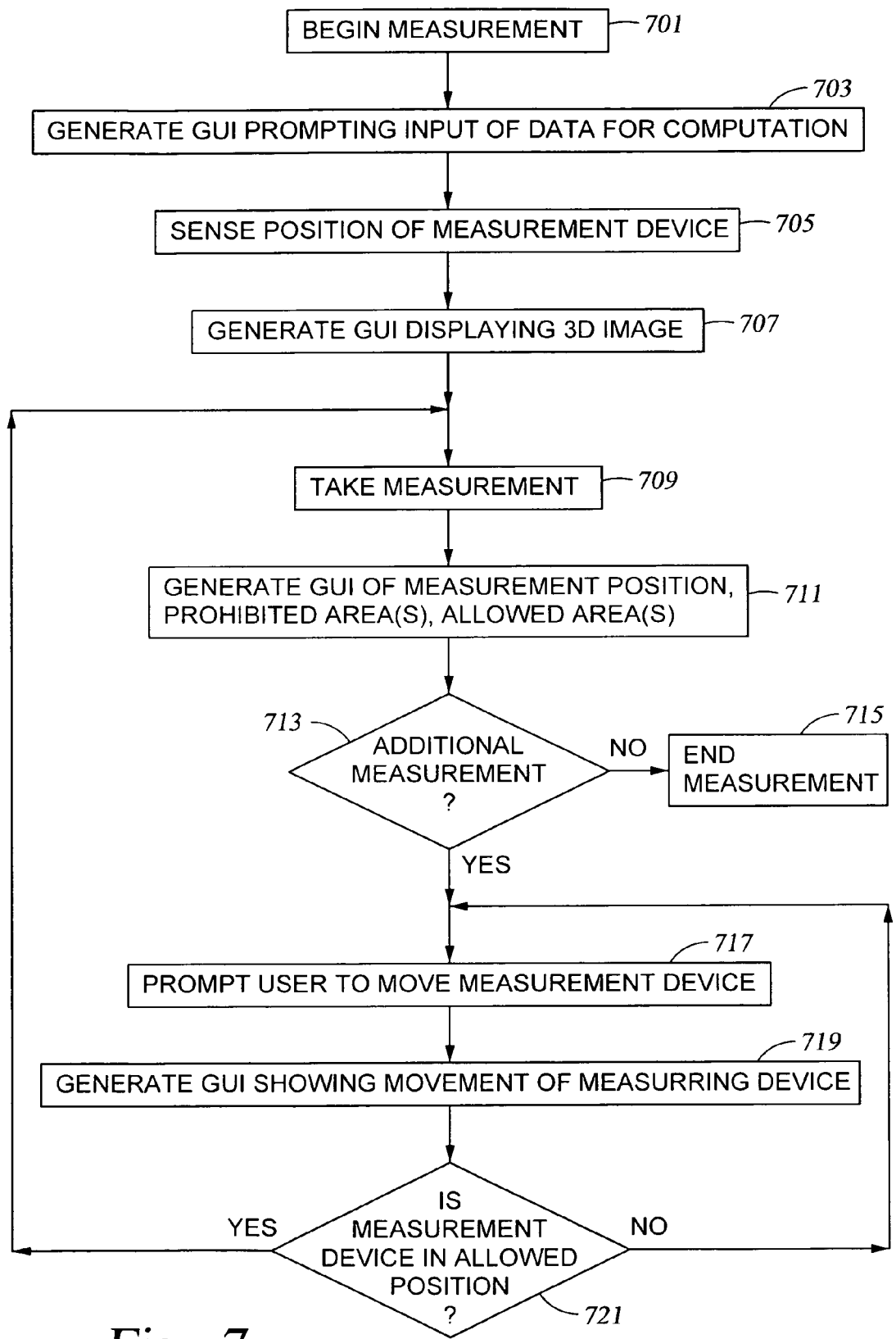
FIG. 7 is flow chart according to an embodiment of the invention.

FIG. 7 shows a flow chart according to an embodiment of the present invention for the measurement of components and/or machines. At 701, a measurement process begins. This can include the powering on of a controller and loading instructions into a cache memory for use by a processor to generate graphical user interfaces (GUIs). This can further include initializing communication between the controller and measurement device(s). Such communication can be wireless or wired. The subsequent GUIs can provide an icon that indicates active communication with the measurement device. At 703, a GUI is generated that prompts the user to enter certain data required for measurement computation. This data can be keyed in by the user or accessed in a stored data file. Examples of this data include dimension or distance measurements relating to the measurement device and/or the subject of the measurement. This GUI can further be presented with a depiction of the actual dimensions needed for input. Icons can indicate the input value and link the dimensions to a rendering of the subject being measured and the measurement device. This rendering can be in three dimensions. In a further example, the rendering is in two dimensions for ease of understanding and entry of the data.

At 705, the position of the measurement device is sensed. At 707, a graphical user interface is generated to display an image of the subject being measured, the position of the measurement device, and possibly a prompt to take a measurement at the current position of the measurement device. This GUI is rendered to appear like a real-world scenario. At 709, a measurement is performed. At 711, a GUI showing a measurement was taken is generated. This GUI can further show the position of the measurement device when the measurement was taken, a prohibited area where a further measurement can not be taken, and an allowed area where a further measurement can be taken. The controller can set the dimensions of the measurement prohibited area based on the distance between the measurement devices. In the case of shaft alignment, the position of the measurement devices is represented as a disk centered on one shaft. The allowed areas of the disk can remain as previously displayed. The prohibited areas of the disk can change in appearance to indicate its status. The prohibited area can be colored, for example, red or made opaque.

At 713, a decision is made whether additional measurements are need to accurately calculate the alignment of the subject under measurement. If no, the measurement process ends at 715. If yes, then the user is prompted to move the measurement device to an allowed measurement position at 717. At 719, a GUI is generated that shows the movement of the measurement device as well as the prohibited measurement area(s). At 721, a decision is made whether the measurement device is in an allowed measurement position. If no, then the process returns to 717. If yes, then the process moves to 709 and a measurement is taken. Once all measurements for the calculation of alignment are made the process can then move to an alignment process.

Figure 8A:
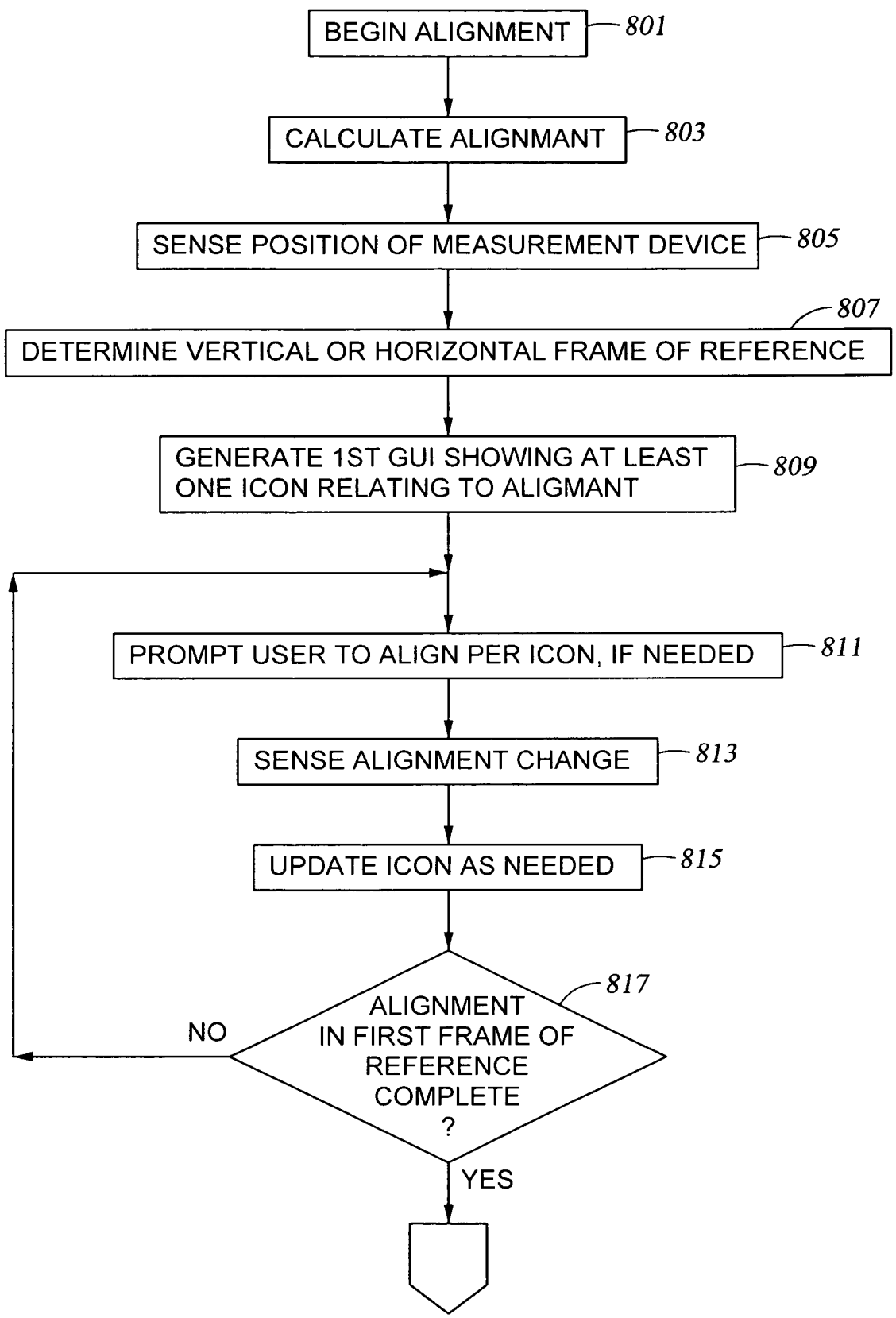
FIGS. 8A and 8B show a flow chart according to an embodiment of the invention.
Figure 8B:
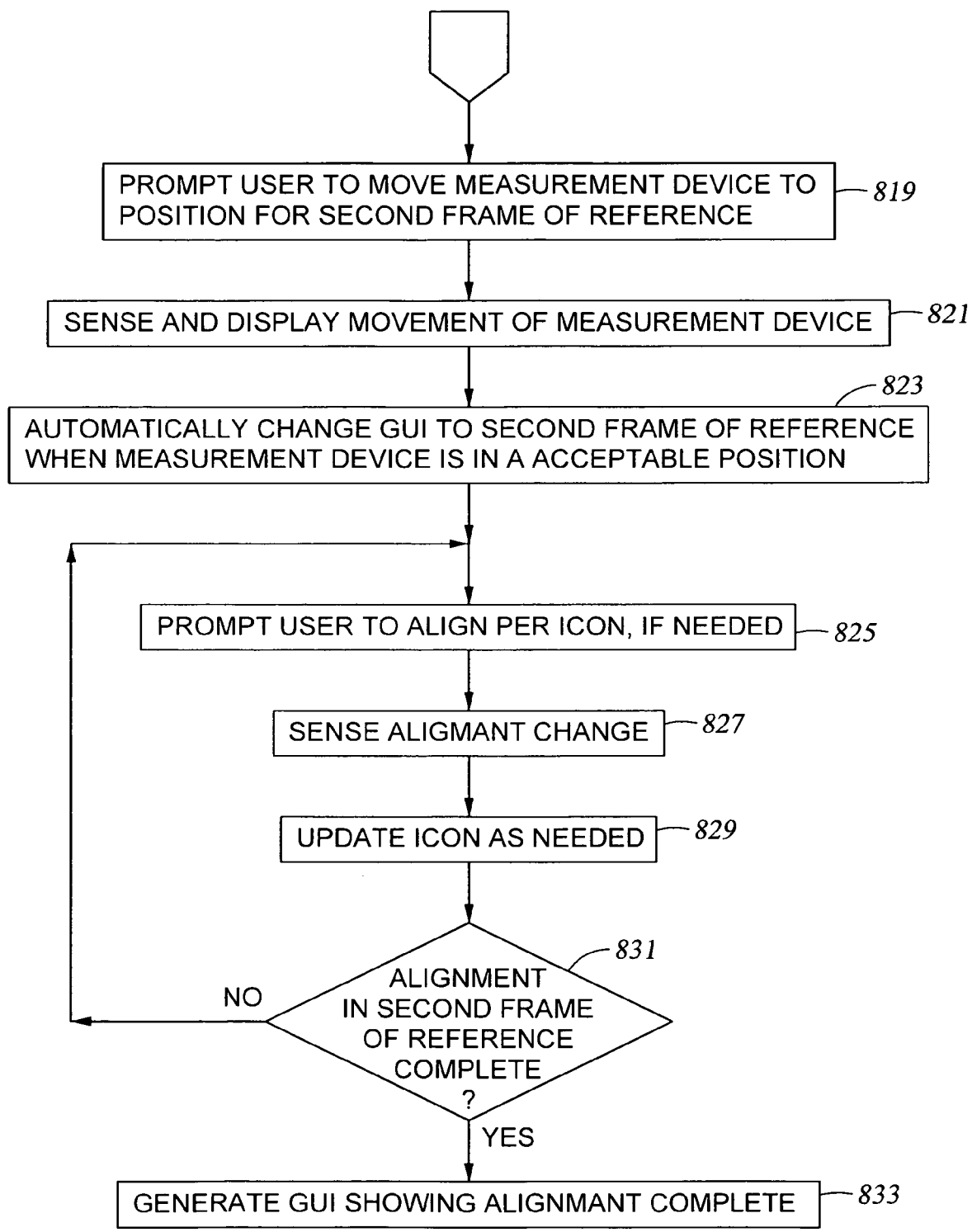

FIGS. 8A and 8B show a flow chart according to an embodiment of the present invention for the alignment of components and/or machines. At 801, an alignment process begins. This may include loading stored and measured data or further inputting data needed for an accurate calculation of alignment. At 803, alignment is calculated. Alignment includes at least one of a horizontal offset, vertical offset, horizontal angular offset, and vertical angular offset. At 805, the position of the measurement device is sensed. If the measurement device is not in a position whereat it can accurately sense only one of horizontal alignment or vertical alignment, the user is prompted to move measurement device to an acceptable position. These positions as well as the current position of the measurement device can be displayed in the GUI. At 807, a frame of reference is determined. The frame of reference is either a vertical frame of reference or a horizontal frame of reference. At 809, a first alignment GUI based on the sensed frame of reference is generated. This alignment GUI includes at least one icon relating to alignment. In an example, the GUI includes a plurality of icons that may include a magnitude icon or a direction icon or a combination of both. These icons may further indicate acceptable alignment by one color and no acceptable alignment with a second color. Moreover, the severity of misalignment can be illustrated by a plurality of colors. The icons may further include a numerical value. It is within the scope of the present invention to allow the user to select the type of icon that best informs the user of the calculated alignment results. For example, the user can select only numerical values or directional arrows. These could then be enlarged to essentially full display screen size to better convey the information. In an example, the GUI includes a two dimensional view of a moveable machine or component, and indicates thereon the magnitude and direction of compensation that the user must apply to the moveable machine or component.

At 811, the user is prompted to align according to the displayed GUI. At 813, the measurement device senses the position change of the moveable machine or component and updates the data in the controller. At 815, the calculations are updated based on new data and icons in the GUI are updated. At 817, a decision whether alignment in the first frame of reference is complete. If no, then the process returns to 811. If yes, then at 819, the user is prompted to move the measurement device to a position associated with the second frame of reference. At 821, the movement of the measurement device is sensed and displayed. At 823, the GUI is automatically changed when the measurement device moves from the prior position to a new position that corresponds to the second frame of reference. In an example, the first frame of reference is the horizontal frame of reference with the associated GUI displaying a top, plan view and the icons relating to horizontal offset and horizontal angular offset. The second frame of reference is the vertical frame of reference with the associated GUI displaying an elevational view and the icons relating to vertical offset and vertical angular offset. Further at 823, the data and icons associated with the second frame of reference are displayed in the GUI.

At 825, the user is prompted to align according to the displayed GUI. At 827, the measurement device senses the position change of the moveable machine or component and updates the data in the controller. At 829, the calculations are updated based on new data and icons in the GUI are updated. At 831, a decision whether alignment in the second frame of reference is complete. If no, then the process returns to 825. If yes, then at 833, a GUI is generated that indicates the alignment process is complete.

It will be understood that the above steps and function may be controlled by the processor 33 based on stored instructions 37, sensed data from an alignment device 8, which may be stored in memory 35 or processed then stored in memory, and user input 39. Based on this data and inputs, the processor drives the display 25 to guide the user in an alignment process. As such the present disclosure describes receipt and transformation of data into a form more easily used by a user to effect accurate corrections to align machines and/or components. That said, various embodiments include a method of instructing a user to measure and align machines and/components through interaction with a graphical user interface, a user input, and a measurement device input. For further examples and description of the colors and other indicia, applicant refers to datakalle.com/xademo and fixturlaser.com with reference to the Express Alignment system, and which are incorporated by reference. Moreover, the data is continually transformed in the real time so that the realignment is efficient.

The above description is intended to be illustrative, and not restrictive. For example, the above-described embodiments and/or examples (or one or more aspects thereof) may be used in combination with each other. The methods described herein may be performed without each of the described sets and/or functions. Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be further understood that some views as filed may contain trade names, trademarks or other graphics that may not be required for the presently claimed devices and methods. It will be further recognized that some icons in the illustrated displays and graphical user interfaces were designed to have ornamentality and changes to the icons' appearance should not effect the scope of the present claims.

Other modifications to and variations of the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention, as defined in the appended claims.

We claim:

1. A method for aligning components, comprising:
   receiving a signal from an alignment measurement device in a controller;
   displaying an avatar representing real-time, moveable position of the alignment measurement device;
   displaying a first fixed avatar representing a first measurement position of the alignment measurement device, which represents a first position of a component;
   storing a first reading from the alignment device;
   displaying a second fixed avatar representing a second measurement position of the alignment device in the controller, which represents a second position of a component;
   displaying alignment measurement positions that includes at least one non-reading position of the alignment measurement device;
   storing a second reading from the alignment measurement device;
   calculating the alignment of the components;
   displaying the calculation to indicate alignment of the components.

2. The method of claim 1, wherein displaying a first real-time position includes displaying the position in a three dimensional, perspective view.

3. The method of claim 1, wherein displaying alignment measurement positions includes displaying a color coded, first region in which the alignment measurement device can take a measurement and displaying a color coded, second region in which the alignment measurement device can not take a measurement.

4. A method for aligning components, comprising:
   receiving a signal from an alignment measurement device in a controller;
   displaying a first real-time position of the alignment measurement device;
   storing a first reading from the alignment device;
   displaying a second real-time position of the alignment device in the controller;
   displaying alignment measurement positions that includes at least one non-reading position of the alignment measurement device;
   storing a second reading from the alignment measurement device;
   calculating the alignment of the components;
   displaying the calculation; and
   wherein, after storing the second reading, further displaying alignment measurement positions that represent at least one of a further reading position of the alignment measurement device and a non-reading position of the alignment measurement device with the at least one of the alignment measurement device and a non-reading position of the alignment measurement device being changed based on one of the first reading and the second reading.

5. The method of claim 4, wherein displaying the calculation automatically switches between a top plan view and an elevation view based on the position of the alignment measurement device.

6. The method of claim 5, wherein displaying indicators includes graphically indicating horizontal misalignment such that the top plan view and horizontal misalignment graphic substantially fill a viewing area of the controller.

7. The method of claim 6, wherein graphically indicating horizontal misalignment includes reducing size of the horizontal misalignment graphic when there is no change in a reading from the alignment measurement device for a select period of time.

8. The method of claim 5, wherein displaying the calculation includes displaying indicators for moving a component to realign the components in at least one of the top plan view and the elevational view.

9. The method of claim 8, wherein displaying indicators includes sizing the indicators based on a magnitude of adjustment.

10. The method of claim 9, wherein displaying indicators includes displaying directional arrows that indicate an alignment direction.

11. The method of claim 9, wherein displaying indicators includes graphically indicating vertical misalignment such that the elevational view and vertical misalignment graphic substantially fill a viewing area of the controller.

12. The method of claim 5, wherein displaying indicators includes graphically indicating horizontal angular misalignment and horizontal offset in a first view in separate icons, and graphically indicating vertical angular misalignment and vertical offset in a second view in separate icons.

13. The method of claim 12, wherein the icons for horizontal angular misalignment and horizontal offset show a representation of both magnitude and direction.

14. The method of claim 13, wherein the icons for vertical angular misalignment and vertical offset show a representation of both magnitude and direction.

15. The method of claim 14, wherein graphically indicating horizontal angular misalignment and vertical angular misalignment includes displaying a green icon with the components being aligned, displaying an orange icon with the components being misaligned, and displaying a red icon when the components are misaligned to a greater extent.

16. A method for aligning components, comprising:
   receiving a signal from an alignment measurement device in a controller;
   displaying a first real-time position of the alignment measurement device;
   storing a first reading from the alignment device;
   displaying a second real-time position of the alignment device in the controller;
   displaying alignment measurement positions that includes at least one non-reading position of the alignment measurement device;
   storing a second reading from the alignment measurement device;
   calculating the alignment of the components;
   displaying the calculation;
   wherein displaying alignment measurement positions includes displaying a color coded, first region in which the alignment measurement device can take a measurement and displaying a color coded, second region in which the alignment measurement device can not take a measurement and
   wherein displaying the second region includes displaying a no measurement region that is based on a distance between measurement devices.

17. A computer-readable medium having stored thereon instructions to cause a computer to perform a method, the method comprising:
   receiving a signal from an alignment measurement device in the controller;
   displaying a first real-time position of the alignment measurement device;
   storing a first reading from the alignment device;

displaying a second real-time position of the alignment device in the controller;

displaying alignment measurement positions that represent at least one non-reading position of the alignment measurement device;

storing a second reading from the alignment measurement device;

calculating the alignment of the components;

displaying the calculation.

18. A computer-readable medium having stored thereon instructions to cause a computer to perform a method, the method comprising:

receiving a signal from an alignment measurement device in the controller;

displaying a first real-time position of the alignment measurement device;

storing a first reading from the alignment device;

displaying a second real-time position of the alignment device in the controller;

displaying alignment measurement positions that represent at least one non-reading position of the alignment measurement device;

storing a second reading from the alignment measurement device;

calculating the alignment of the components;

displaying the calculation; and wherein after storing the second reading, further displaying alignment measurement positions that represent at least one of a further reading position of the alignment measurement device and a non-reading position of the alignment measurement device with the at least one of the alignment measurement device and a non-reading position of the alignment measurement device being changed based on one of the first reading and the second reading.

19. The computer-readable medium of claim 18, the method further comprising:

wherein displaying the calculation includes graphically displaying a top plan view of the components with the alignment measurement device in a non-vertical position;

wherein displaying the calculation includes graphically displaying an elevational view of the components with the alignment measurement device in a non-horizontal position; and wherein displaying the calculation automatically switches between the top plan view and the elevation view based on the position of the alignment measurement device.

20. The computer-readable medium of claim 19, the method further comprising:

wherein automatically displaying the calculation includes displaying indicators for moving a component to realign the components in at least one of the top plan view and the elevational view;

wherein automatically displaying indicators includes sizing the indicators based on a magnitude of adjustment; and wherein displaying indicators includes displaying directional arrows that indicate an alignment direction.

21. The computer-readable medium of claim 20, the method further comprising:

wherein displaying indicators includes graphically indicating horizontal misalignment and vertical misalignment in separate icons with color coding representing magnitude of misalignment;

wherein graphically indicating horizontal misalignment and vertical misalignment includes displaying a green icon with the components being aligned, displaying an orange icon with the components being misaligned, and displaying a red icon when the components are misaligned to a greater extent;

wherein displaying indicators includes graphically indicating horizontal misalignment such that the top plan view and horizontal misalignment graphic substantially fill a viewing area of the controller, and wherein graphically indicating horizontal misalignment includes reducing size of the horizontal misalignment graphic when there is no change in a reading from the alignment measurement device for a select period of time.

22. An apparatus for aligning components, comprising:

an input to receive positional signals from an alignment measurement device;

a processor operatively coupled to the input, the processor to generate a real-time graphic signal based on received signals at the input and trigger alignment readings from the alignment measurement device, the processor to determine positions whereat successive alignment readings should not be made and to output a no reading signal, and the processor to calculate misalignment of components engaged by the alignment measurement device; and a display operatively coupled to the processor, the display to show a real-time position of the alignment measurement device and a no reading area based on the no reading signal from the processor, and the display to graphically indicate the calculated misalignment.

23. The apparatus of claim 22, wherein the display is to show a three dimension view of the real-time position of the alignment measurement device and a three dimension view of a no reading area based on the no reading signal from the processor.

24. The apparatus of claim 22, wherein the display is to show a two dimension view of a misalignment graphic of a component to be adjusted into alignment.

25. The apparatus of claim 22, wherein the processor is to take at least three alignment readings from the alignment measurement device prior to calculating misalignment of components.

26. The apparatus of claim 25, wherein the processor determines a size of a no reading area and produces a no reading signal for display.

27. The apparatus of claim 26, wherein the display receives the no reading signal and simultaneously displays the no reading area and the position of the alignment device.

28. The apparatus of claim 27, wherein the display shows a three dimension view of the measurement area of the components and the position of the alignment device.

29. The apparatus of claim 27, wherein the processor automatically takes an alignment reading when the alignment measurement device is moved outside a no reading area.

30. The apparatus of claim 22, wherein the processor reads the input after calculation of misalignment to produce real-time signal to control the display to show an elevational view with the alignment device in a non-horizontal position and to show a top plan view with the alignment device in a non-vertical position, each of the views including graphical misalignment indicators.

31. The apparatus of claim 30, wherein the graphical misalignment indicators include directional arrows that show the direction that each end of a moveable component must be moved to align the components.

32. The apparatus of claim 31, wherein the directional arrows are sized to correspond to the magnitude of alignment needed to align.

33. The apparatus of claim 30, wherein the graphical misalignment indicators include a horizontal angular alignment icon, horizontal offset alignment icon, vertical angular alignment icon, and a vertical alignment offset icon.

34. The apparatus of claim 33, wherein the icons are each individually color coded to indicate the magnitude of alignment.

35. The apparatus of claim 34, wherein the processor continues to read the input, recalculate the misalignment, and send signals to the display to show changes to misalignment.

* * * * *